(12) United States Patent  (10) Patent No.: US 8,867,828 B2
Kim et al.  (45) Date of Patent: Oct. 21, 2014

(54) TEXT REGION DETECTION SYSTEM AND METHOD

(75) Inventors: Chunghoon Kim, Seongnam-si (KR); Hyung-Il Koo, Seoul (KR); Kyu Woong Hwang, Taejon (KR)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 13/324,282

(22) Filed: Dec. 13, 2011

(65) Prior Publication Data

US 2012/0224765 A1  Sep. 6, 2012

Related U.S. Application Data

(60) Provisional application No. 61/449,503, filed on Mar. 4, 2011.

(51) Int. Cl.
*G06K 9/62* (2006.01)
*G06K 9/32* (2006.01)

(52) U.S. Cl.
CPC .............. *G06K 9/6256* (2013.01); *G06K 9/325* (2013.01)
USPC ............................. 382/159; 382/198; 382/205

(58) Field of Classification Search
None
See application file for complete search history.

(56) References Cited

U.S. PATENT DOCUMENTS

| | | | |
|---|---|---|---|
| 7,616,814 | B2 | 11/2009 | Wolf et al. |
| 7,817,855 | B2 | 10/2010 | Yuille et al. |
| 2005/0196043 | A1 | 9/2005 | Jung et al. |
| 2009/0324081 | A1 | 12/2009 | Oh et al. |

FOREIGN PATENT DOCUMENTS

WO  WO02095662 A1  11/2002

OTHER PUBLICATIONS

Yi-Feng Pan et al., "A Robust System to Detect and Localize Texts in Natural Scene Images", IEEE publication—Eighth IAPR Workshop on Document Analysis Systems, published in 2008, pp. 35-42.*
Navneet Dalal et al., "Histograms of Oriented Gradients for Human Detection", IEEE Computer Society Conference on Computer Vision and Pattern Recognition (CVPR'05), published in 2005, 8 pages total.*
Written Opinion of the International Preliminary Examining Authority for PCT/US2012/027144 mailed Feb. 20, 2013, 7 pp.
International Preliminary Report on Patentablility for PCT/US2012/027144 mailed Jun. 7, 2013, 41 pp.
Asif Shahab et al: "ICDAR 2011 Robust Reading Competition Challenge 2: Reading Text in Scene Images", 2011 International Conference on Document Analysis and Recognition, Sep. 1, 2011, pp. 1491-1496.

(Continued)

*Primary Examiner* — Brian P Werner
(74) *Attorney, Agent, or Firm* — Toler Law Group, PC

(57) ABSTRACT

A method for detecting a text region in an image is disclosed. The method includes detecting a candidate text region from an input image. A set of oriented gradient images is generated from the candidate text region, and one or more detection window images of the candidate text region are captured. A sum of oriented gradients is then calculated for a region in one of the oriented gradient images. It is classified whether each detection window image contains text by comparing the associated sum of oriented gradients and a threshold. Based on the classifications of the detection window images, it is determined whether the candidate text region is a true text region.

59 Claims, 27 Drawing Sheets

(56) References Cited

OTHER PUBLICATIONS

Xiangrong Chen, et al., "Detecting and reading text in natural scenes," IEEE Computer Society Conference on Computer Vision and Pattern Recognition (CVPR'04), 2004, pp. 1-8.

International Search Report and Written Opinion—PCT/US2012/027144—ISA/EPO—Jun. 5, 2012.

Lienhart R Ed—Rosenfeld A et al: "Video OCR: A Survey and Practitioner's Guide", Jan. 1, 2003, Video Mining; [Kluwer International Series in Video Computing], Norwell, MA : Kluwer Academic Publ, US, pp. 155-183.

M. Lalonde: "Key-text spotting in documentary videos using Adaboost", Proceedings of SPIE, vol. 6064, Jan. 1, 2006, pp. 60641N-60641N-8.

Paul Viola and Michael Jones, "Rapid object detection using a boosted cascade of simple features," IEEE conference on computer vision and pattern recognition, vol. 1, pp. I-511-I-518, 2001.

Piotr Dollar et al: "Integral Channel Features", Procedings of the British Machine Vision Conference 2009, Jan. 1, 2009, pp. 91.1-91.11.

* cited by examiner

TEXT REGION DETECTION SYSTEM AND METHOD

CROSS-REFERENCE TO RELATED APPLICATIONS

This application is based upon and claims the benefit of priority from U.S. Provisional Patent Application No. 61/449,503, filed on Mar. 4, 2011, the entire contents of which are incorporated herein by reference.

TECHNICAL FIELD

The present disclosure relates to text region detection. More specifically, the present disclosure relates to text region detection systems and methods for verifying whether a potential text region in an image is a true text region.

BACKGROUND

Modern imaging devices such as cameras, camcorders, scanners, and mobile phones are often equipped with image sensors for capturing images. Such imaging devices with image sensors are commonly used to capture images with text. For example, users of mobile phones often take pictures of images with text such as books, menus, advertisements, street signs, billboard signs, news articles, etc. Text information from captured images is then obtained by text detection and recognition methods. The text information thus obtained may be used to identify the images for storage or retrieval.

In recognizing text information, it is generally necessary to first detect a potential text region and determine whether the potential text region contains text. If the text region contains text, the text is then recognized by a text recognition method (e.g., OCR). On the other hand, if the text region does not contain text, the potential text region is discarded.

Unfortunately, conventional text detection methods often erroneously recognize potential text regions, which do not contain text, as text regions containing valid text. Such cases of erroneous detection increases particularly when images include complex non-text backgrounds or patterns. However, even in such cases, text recognition methods are generally applied to the falsely detected text regions, thereby producing unrecognizable results while consuming computing resources.

Therefore, there is a need to reduce erroneous detections of text regions to facilitate more accurate text recognition and save computing resources.

SUMMARY

According to one aspect of the present disclosure, a method for detecting a text region in an image is disclosed. The method includes detecting a candidate text region from an input image. A set of oriented gradient images is generated from the candidate text region, and one or more detection window images of the candidate text region are captured. A sum of oriented gradients is then calculated for a region in one of the oriented gradient images. It is classified whether each detection window image contains text by comparing the associated sum of oriented gradients and a threshold. Based on the classifications of the detection window images, it is determined whether the candidate text region is a true text region. This disclosure also describes an apparatus, a combination of means, and a computer-readable storage medium relating to this method.

According to another aspect of the present disclosure, a method for detecting a text region in an image is disclosed. The method includes i) detecting a candidate text region from an input image, ii) generating a set of oriented gradient images of the candidate text region, iii) capturing one or more detection window images from the candidate text region, iv) calculating a sum of oriented gradients from a region in an oriented gradient image obtained from each detection window image, v) classifying whether each detection window image contains text by comparing the sum of oriented gradients and a threshold, and vi) determining whether each detection window image contains text based on each classification. If each detection window image is determined to contain text, the operations iv) to vi) above is repeated to determine whether the candidate text region is a true text region. This disclosure also describes an apparatus, a combination of means, and a computer-readable storage medium relating to this method.

According to yet another aspect of the present disclosure, a method for providing one or more classifiers for classifying an image into a text region is disclosed. The method includes providing a plurality of oriented gradient images generated from learning sample images. In this method, one or more oriented gradient images are generated from each learning sample image including a tag indicating whether the learning sample image is a text image or non-text image. A plurality of candidate weak classifiers is then generated. Each of the candidate weak classifiers includes parameters defining a region and a direction of an oriented gradient image and is configured to classify each learning sample image based on a sum of oriented gradients calculated for the defined region and direction. It is then verified whether each candidate weak classifier correctly classifies each learning sample image based on the tag, and an error rate for each candidate weak classifier is determined. One or more weak classifiers are selected from the candidate weak classifiers based on the error rate of each candidate weak classifier. This disclosure also describes an apparatus, a combination of means, and a computer-readable storage medium relating to this method.

According to still another aspect of the present disclosure, an apparatus for detecting a text region in an image is disclosed. The apparatus includes a candidate text region detector configured to receive an input image and detect a candidate text region from the input image. Further, a gradient image generator is provided to receive the candidate text region from the candidate region detector and generate a set of oriented gradient images of the candidate text region. A detection window locator then captures one or more detection window images of the candidate text region. The apparatus further includes a plurality of classifiers arranged in series, each classifier being configured to classify whether each detection window image contains text based on a plurality of sums of oriented gradients when the classification from the previous classifier in the series indicates that the detection window image contains text. In this configuration, each of the sums of oriented gradients is calculated for a region in one of the oriented gradient images. Based on the classifications of the detection window images, a first determination unit of the apparatus is configured to determine whether the candidate text region is a true text region.

DETAILED DESCRIPTION

Figure 1:
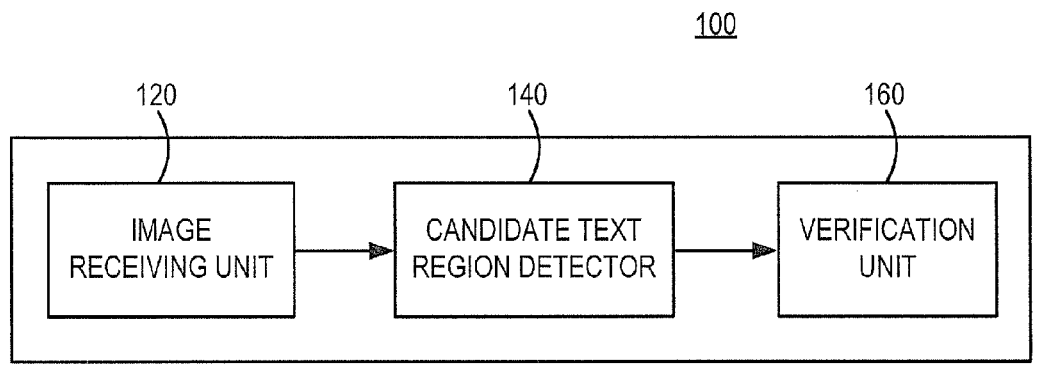
FIG. 1 is a schematic diagram of a text region detection system according to one embodiment.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

FIG. 1 is a schematic diagram of a text region detection system 100 for detecting a text region from an image according to one embodiment. The text region detection system 100 includes an image receiving unit 120, a candidate text region detector 140, and a verification unit 160. The image receiving unit 120 is configured to receive and provide an image to the candidate text region detector 140 for text region detection. The image receiving unit 120 may be an image capturing device such as a camera, a camcorder, a scanner, etc., or an interface configured to receive an image file via a network from external devices for text region detection.

The candidate text region detector 140 is configured to detect one or more candidate text regions from the input image based on well-known geometric primitives such as blobs and edges in the input image. In some embodiments, a Canny edge detection method is used to detect edges from the input image, and character components (e.g., text characters) are detected based on the detected geometric primitives according to well-known algorithms such as Flood-fill algorithm. The candidate text region detector 140 localizes a minimum rectangle for each character component in a character component box.

The candidate text region detector 140 then merges one or more of the adjacent character component boxes into a candidate text region. In merging character component boxes, a distance among the character component boxes may be measured and horizontally adjacent character component boxes may be merged to font) a candidate text region. Alternatively or additionally, character component boxes that are similar in size and color may be merged into a candidate text region.

Merging of the character component boxes may result in a skewed rectangle for the candidate text region. In some embodiments, the candidate text region detector 140 is configured to geometrically rectify a skewed candidate text region into a rectangular candidate text region. For example, an affine transformation method may be used to transform the skewed candidate text region into a rectangle.

In some embodiments, the candidate text region detector 140 may be further configured to resize the rectified candidate text region according to a desired detection window size. For example, if the candidate text region has a width longer than a height, the candidate text region can be resized to a predetermined height (e.g., 20 pixels) of the desired detection window. Conversely, if the candidate text region has a height longer than a width, the candidate text region can be resized to a predetermined width (e.g., 20 pixels) of the desired detection window.

The verification unit 160 is configured to receive the candidate text region from the candidate text region detector 140 and verify whether the candidate text region is a true text region. In verifying the candidate text region, one or more detection window images are captured from the candidate text region, and a plurality of sums of oriented gradients is calculated for regions in the detection window images. The verification of the candidate text region is made based on classifications of whether the detection window images contain text.

The text region detection system 100 may be implemented in any suitable imaging devices including computer systems and electronic portable devices equipped with image sensors such as mobile phones, tablet computers, etc. In some embodiments, the text region detection system 100 may be operational in any type of network, as well as any combination of networks, including cellular networks, circuit switching networks, public switching networks, local area networks, wide area networks, wireless networks, and/or packet switching networks, etc.

Figure 2A:
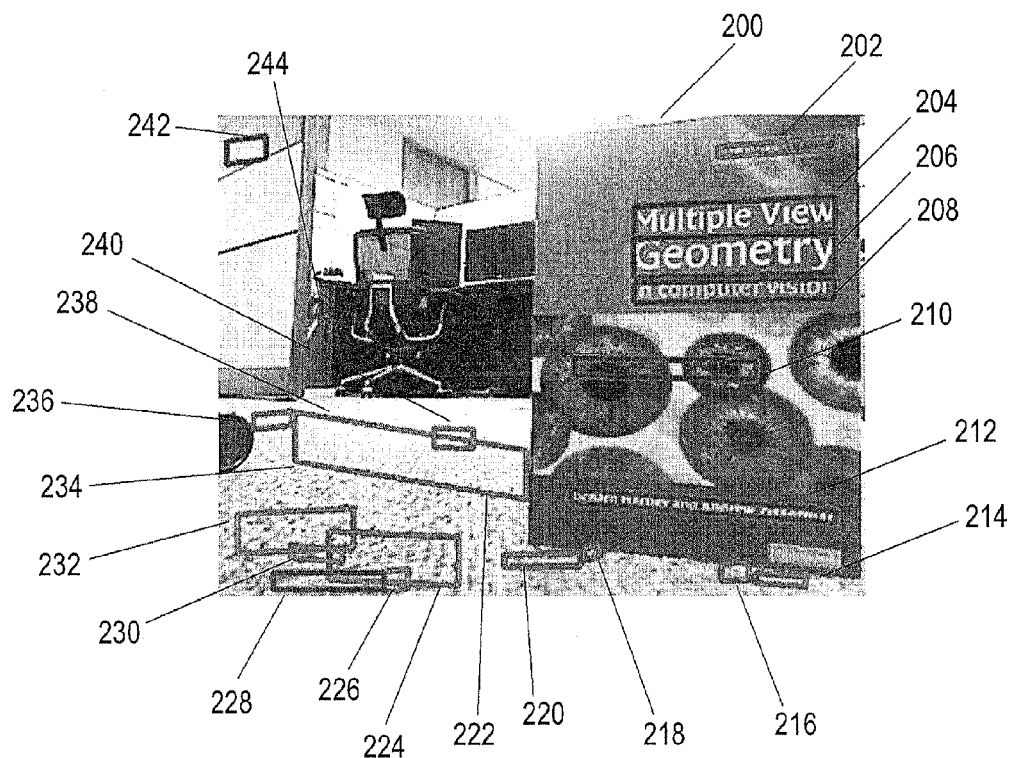
FIG. 2A shows exemplary candidate text regions detected in an image.

FIG. 2A shows an exemplary input image 200 and candidate text regions 202 to 244 detected from the input image 200. In this image, the candidate text region detector 140 detects candidate text regions 202 to 244 including non-text regions 210, 214 to 244 and true text regions 202, 204, 206, 208, and 212. The candidate text regions 202 to 244 are rectified and provided to the verification unit 160 to determine whether the candidate text regions are true text regions.

Figure 2B:
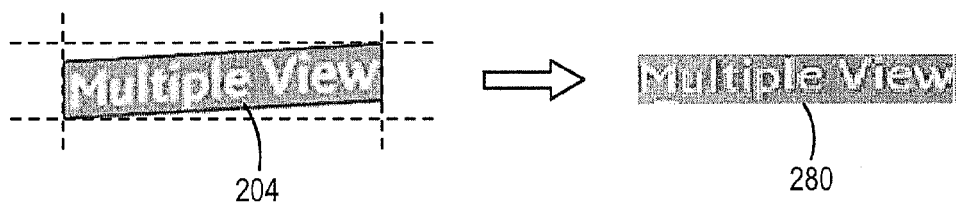
FIG. 2B shows a rectified candidate text region of a captured candidate text region.

FIG. 2B shows an exemplary rectified candidate text region 280 of the candidate text region 204. As shown in FIG. 2B, the candidate text region 204 is skewed in both horizontal and vertical directions as shown in reference to dotted horizontal and vertical lines. The candidate text region 280 is a rectified image of the original candidate text region 204, as rectified by the candidate text region detector 140.

Figure 3:
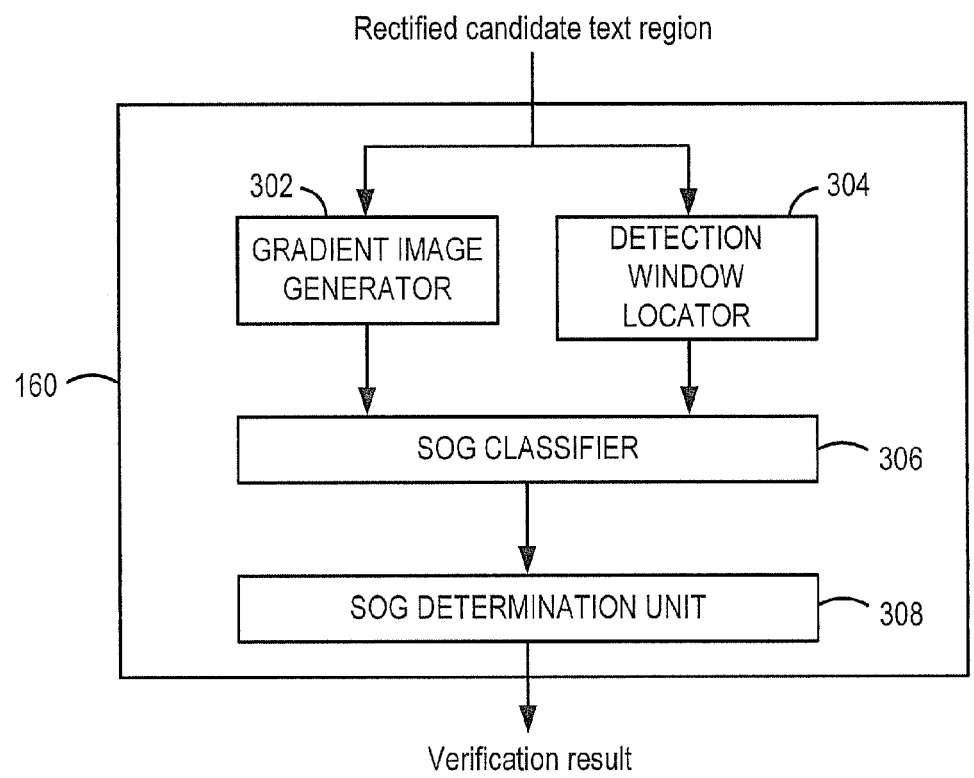
FIG. 3 is a schematic block diagram of a verification unit for verifying a rectified candidate text region according to one embodiment.

FIG. 3 is a schematic block diagram of the verification unit 160 for verifying a candidate text region according to one embodiment. The verification unit 160 may include a gradient image generator 302, a detection window locator 304, a sum of oriented gradients (SOG) classifier 306, and a SOG determination unit 308. In this configuration, the gradient image generator 302 is configured to receive a rectified candidate text region and, if the candidate text region is a color image, transform the candidate text region into a gray image. The gradient image generator 302 then generates a set of gradient images (e.g., four gradient images) from the candidate text region. In this context, a gradient refers to a directional change in gray levels in an image. A gradient image includes a plurality of pixels, each of which represents a directional change in gray levels at the corresponding pixel location in the original candidate text region. In one embodiment, the gradient image generator 302 is configured to calculate a gradient for each pixel of the candidate text region according to a predetermined direction.

The detection window locator 304 is configured to receive the rectified candidate text region and slide a detection window of a predetermined size over the candidate text region. As the detection window is slid over the candidate text region, portions of the candidate text region corresponding to the size and location of detection window are captured as a sequence of detection window images. In this process, the portions of the candidate text region captured as the detection window images may or may not overlap in some parts.

The SOG classifier 306 is configured to receive at least one of the gradient images from the gradient image generator 302 and the locations of the sequence of detection window images from the detection window locator 304 corresponding to the candidate text region. The SOG classifier 306 calculates a plurality of sums of oriented gradients for predetermined regions in each of the detection window images based on the received gradient image. Based on the sums of oriented gradients, the SOG classifier 306 classifies whether each detection window image contains text.

The SOG determination unit 308 is configured to determine whether the candidate text region is a true text region based on the classification results of the detection window images from the SOG classifier 306. The SOG determination unit 308 may be configured with a threshold value for determining a candidate text region as a true text region. For example, if the number of detection window images classified as containing text is more than the threshold value, the candidate text region is determined to be a true text region.

Figure 4A:
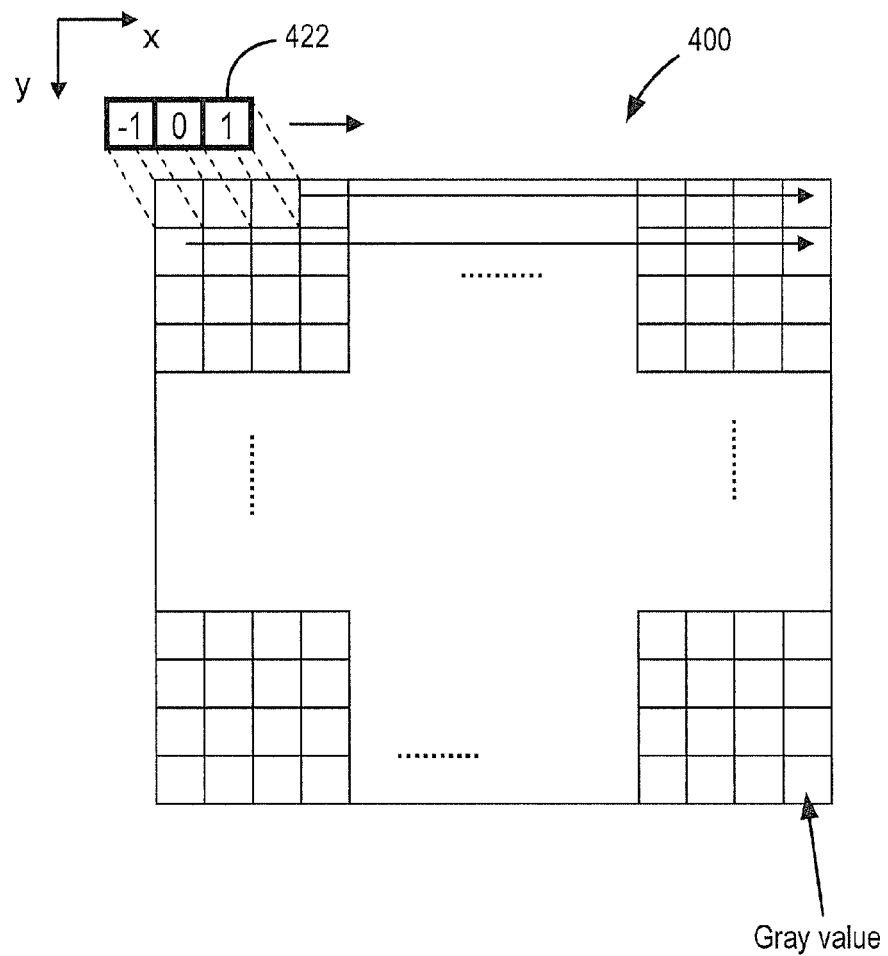
FIGS. 4A to 4E depict generating gradient images for use in calculating sums of oriented gradients according to one embodiment.

FIGS. 4A to 4E depict generating four exemplary gradient images by the gradient image generator 302 for use in calculating sums of oriented gradients according to one embodiment. FIG. 4A shows a process of calculating gradients from a gray level image 400 of the rectified candidate text region 280 along a horizontal direction. As described above, the gradient image generator 302 converts the candidate text region 280 into the gray level image 400. For example, each pixel of the gray level image 400 has a gray value ranging from "0" indicating a black pixel to "255" indicating a white pixel. The gradient image generator 302 calculates directional changes in the gray levels of horizontally adjacent pixels in the gray level image 400.

For calculating a gradient of a pixel (x, y) in the horizontal direction, the gradient image generator 302 may apply, for example, a horizontal mask 422 represented by [−1, 0, 1] to three adjacent pixels (x−1, y), (x, y) and (x+1, y) arranged in a horizontal direction to calculate a horizontal gradient $H_{x\_y}$ of the pixel (x, y). In this case, the horizontal gradient $H_{x\_y}$ is calculated as follows:

$$H_{x\_y} = (-1 \times I_{x-1\_y}) + (0 \times I_{x\_y}) + (1 \times I_{x+1\_y}) \quad [1]$$

where $I_{x-1\_y}$, $I_{x\_y}$, and $I_{x+1\_y}$ refer to gray values of the pixels (x−1, y), (x, y), and (x+1, y), respectively. The horizontal gradients for other pixels may be calculated in a similar manner. The horizontal gradients obtained for the pixels in the gray level image 400 form a gradient image along the horizontal direction.

Figure 4B:
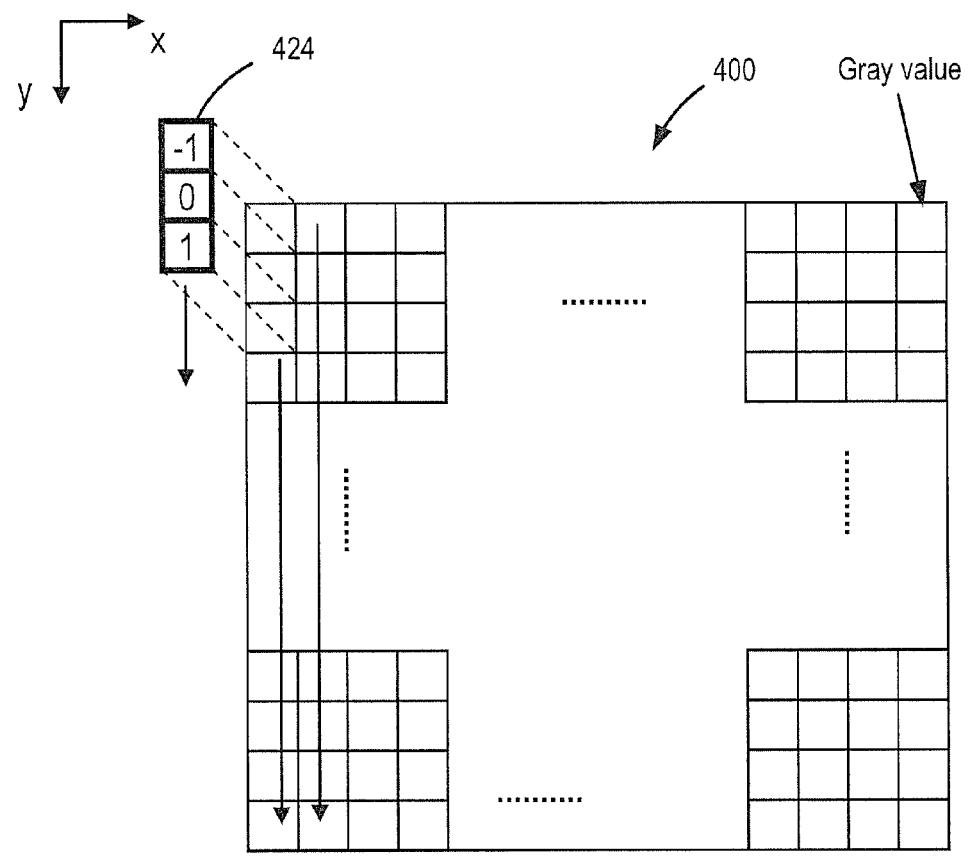

FIG. 4B shows a process of calculating a gradient from a gray level image 400 of the rectified candidate text region 280 along a vertical direction. The gradient image generator 302 calculates directional changes in the gray levels of vertically adjacent pixels in the gray level image 400. For calculating a gradient of a pixel (x, y) in the vertical direction, the gradient image generator 302 may apply, for example, a vertical mask 424 represented by $[-1, 0, 1]^T$ to three adjacent pixels (x, y−1), (x, y), and (x, y+1) arranged in a vertical direction. In this case, the vertical gradient $V_{x\_y}$ is calculated as follows:

$$V_{x\_y} = (-1 \times I_{x\_y-1}) + (0 \times I_{x\_y}) + (1 \times I_{x\_y+1}) \quad [2]$$

where $I_{x\_y-1}$, $I_{x\_y}$, and $I_{x\_y+1}$ refer to gray values of the pixels (x, y−1), (x, y), and (x, y+1), respectively. The vertical gradients for other pixels may be calculated in a similar manner. The vertical gradients obtained for the pixels in the gray level image 400 form a gradient image along the vertical direction.

Based on the horizontal and vertical gradients, the gradient image generator 302 generates a gradient vector for each pixel, including a horizontal gradient component and a vertical gradient component. For example, the gradient vector $\vec{G}_{x\_y}$ of a pixel (x, y) is obtained by the following equation:

$$\vec{G}_{x\_y} = H_{x\_y} \cdot \hat{x} + V_{x\_y} \cdot \hat{y} \quad [3]$$

where $\hat{x}$ and $\hat{y}$ refer to a horizontal and a vertical unit vectors, respectively, while $H_{x\_y}$ and $V_{x\_y}$ refer to the horizontal gradient component and the vertical gradient component of the pixel (x, y), respectively.

Figure 4C:
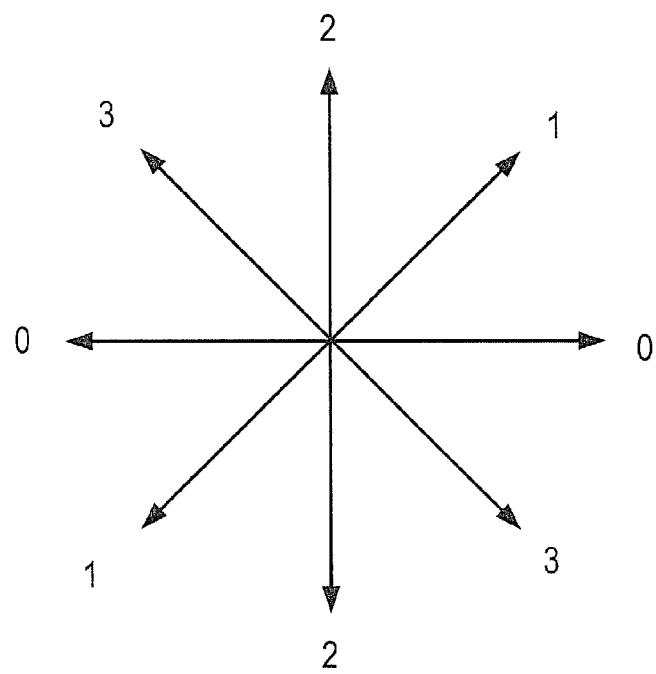

FIG. 4C illustrates four orientations (e.g., directions), Orientations 0 to 3, representing horizontal, vertical, and two diagonal orientations among which the gradient vector for each pixel in the gray level image 400 can be decomposed in two nearest orientations. For a given gradient vector, two nearest adjacent orientations are selected from the four orientations based on the direction of the gradient vector.

Figure 4D:
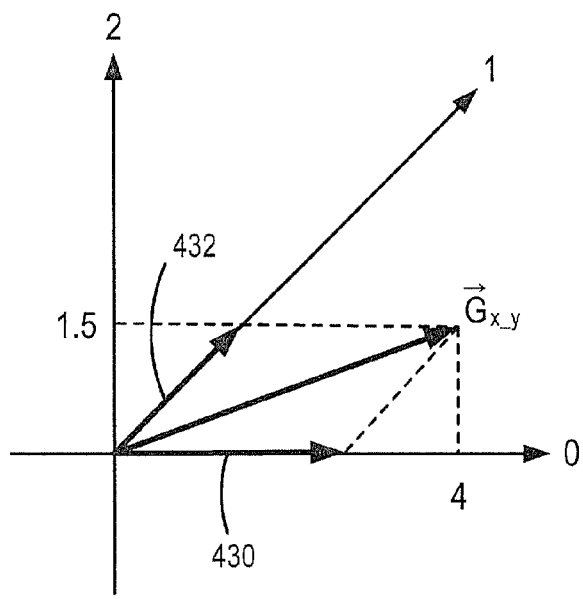
Figure 4E:
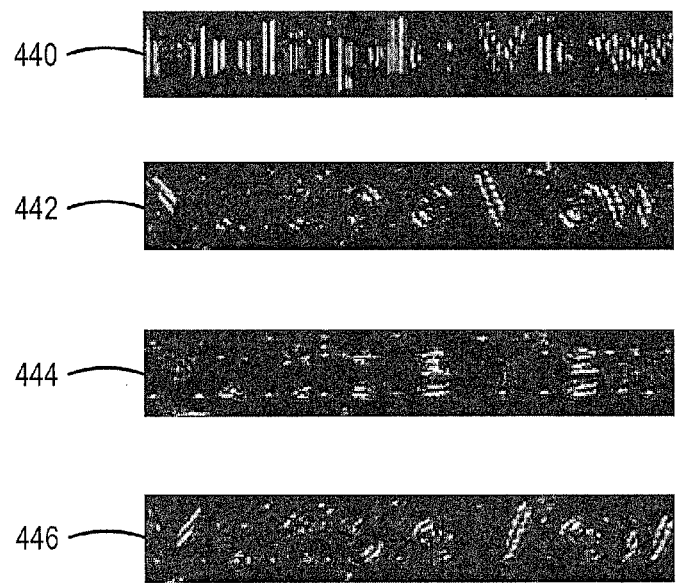

FIG. 4D illustrates decomposing an exemplary gradient vector $\vec{G}_{x\_y}=4\cdot\hat{x}+1.5\cdot\hat{y}$ of a pixel into two nearest adjacent orientations, Orientations 0 and 1, to generate gradients 430 and 432 in Orientations 0 and 1, respectively, for the pixel. In this manner, two gradients of different orientations are generated based on the gradient vector for each pixel. In this context, the gradient of a particular predetermined orientation is referred to as an oriented gradient. By generating oriented gradients along a particular orientation for the pixels in the gray level image 400, an oriented gradient image is generated. FIG. 4E illustrates exemplary oriented gradient images 440, 442, 444, and 446 generated for Orientations 0, 1, 2 and 3, respectively, for the rectified candidate text region 280 shown in FIG. 2B.

Figure 5B:
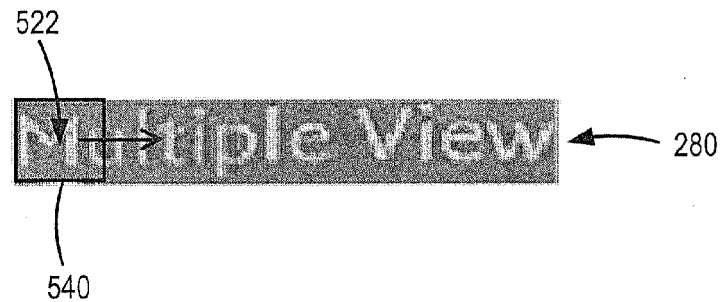
FIGS. 5A to 5C depict a series of detection window images captured from a rectified candidate text region according to one embodiment.
Figure 5C:
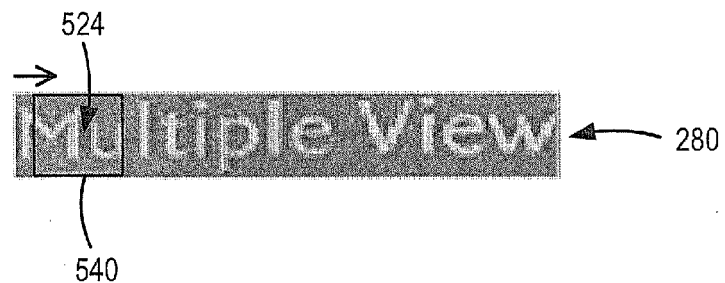
Figure 5A:
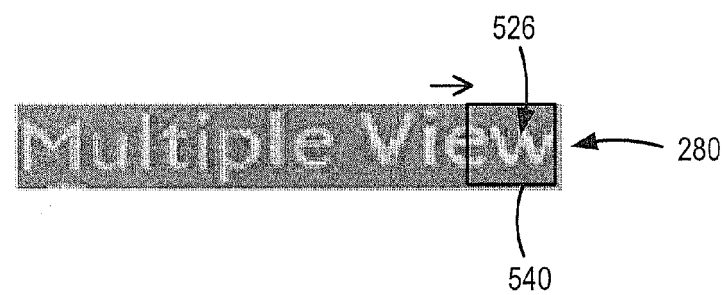

FIGS. 5A to 5C depict a plurality of detection window images 522, 524, and 526 captured by the detection window locator 304 in sequence from the rectified candidate text region 280 according to one embodiment. The detection window images 522, 524, and 526 are captured from the candidate text region 280 by moving a detection window 540 in a horizontal direction from the beginning to the end of the candidate text region 280. As such, the detection window images 522, 524, and 526 have the same size as the detection window 540 but represent different locations in the candidate text region 280. Each time the detection window 540 is moved by a predetermined interval (e.g., 4 pixels), a corresponding detection window image is captured from the candidate text region 280. Initially, as shown in FIG. 5A, the first detection window image 522 is captured when the detection window 540 is at the beginning position of the candidate text region 280. Then, as shown in FIG. 5B, the detection window 540 is moved by the predetermined interval and the second detection window image 524 is captured. In this manner, the detection window 540 is moved in sequence by the predetermined number of intervals to capture intermediate detection window images. When the detection window 540 reaches the end of the candidate text region 280, the last detection window image 526 is captured as illustrated in FIG. 5C. As shown in FIGS. 5A to 5C, the detection window images 522, 524, and 526 are captured to partially overlap adjacent detection window images.

As the interval of moving the detection window 540 increases (e.g., more than 4 pixels), fewer detection window images are generated from the candidate text region 280, thereby reducing the computational load of the text detection system. On the other hand, as the interval of moving the detection window 540 decreases (e.g., less than 4 pixels), more detection window images are generated from the candidate text region 280, thereby improving the accuracy of text detection. Although FIGS. 5A to 5C illustrate moving the detection window 540 in the horizontal direction of the candidate text region 280, the detection window 540 may also be moved in a vertical direction. For example, if the candidate text region is arranged in a vertical direction, the detection window 540 may be moved in a vertical direction of the candidate text region to capture detection window images.

Figure 6:
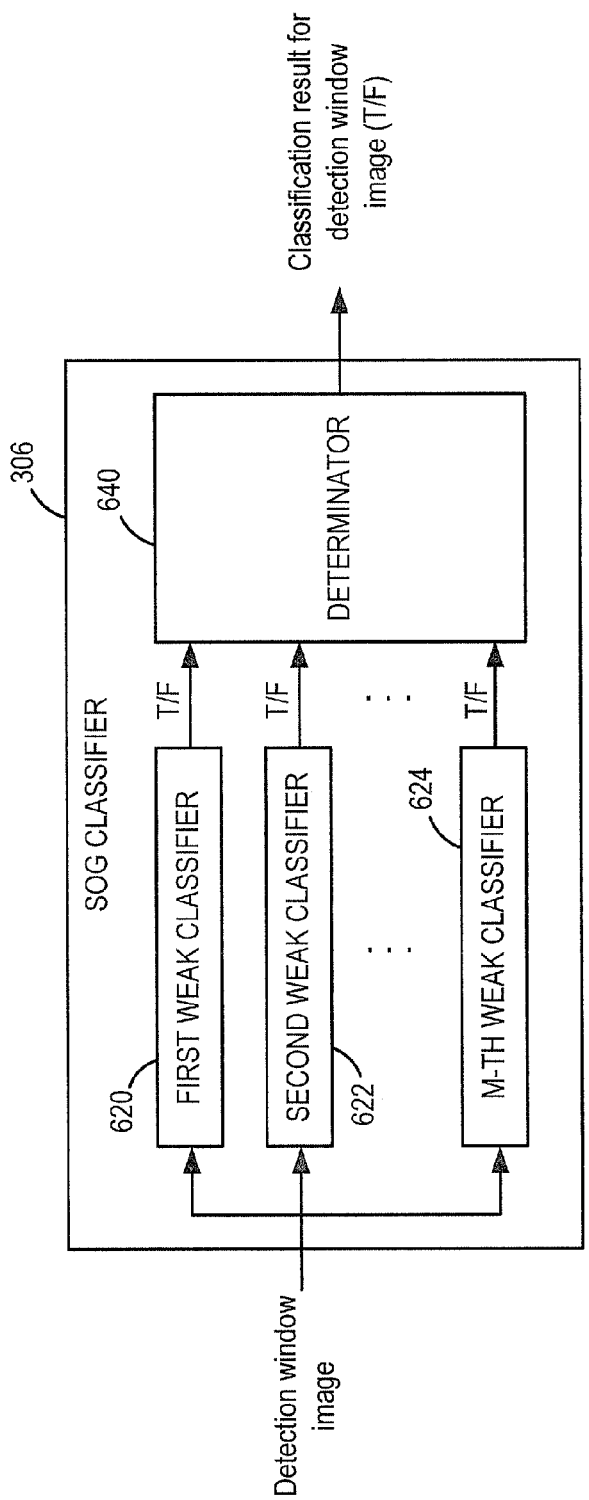
FIG. 6 illustrates a schematic block diagram of a sum of oriented gradients (SOG) classifier for classifying detection window images according to one embodiment.

FIG. 6 illustrates a schematic block diagram of the sum of oriented gradients (SOG) classifier 306 for classifying detection window images according to one embodiment. The SOG classifier 306 may be configured to receive the oriented gradient images, from the gradient image generator 302, and store the received images for further processing. The SOG classifier 306 may include a plurality of weak classifiers (i.e., sub-classifiers) 620 to 624, which may be arranged in parallel, and may be configured to sequentially receive the locations of the detection window images and may classify whether each detection window image contains text. The number of the weak classifiers can be determined in a learning process for generating weak classifiers, which will be described later, according to the desired accuracy and sensitivity of the classification.

In the SOG classifier 306, each weak classifier 620 to 624 is configured with a predetermined orientation, a predetermined region in a detection window image, and a threshold. Each of the weak classifiers 620 to 624 is configured to obtain a portion of an oriented gradient image corresponding to its predetermined orientation, where the portion corresponds to the detection window image in size and location. Each classifier 620 to 624 calculates a sum of oriented gradients for its predetermined region in the portion of the oriented gradient image, and classifies whether the detection window image contains text based on the sum of oriented gradients. The detection window image may be further classified in each weak classifier 620 to 624 as containing text if the sum of oriented gradients exceeds the threshold. Each classifier 620 to 624 outputs a True or False (T/F) value as a classification result indicating that the detection window image contains text or not, respectively.

In some embodiments, the classification result in each weak classifier 620 to 624 may be further processed according to a polarity indicating whether to change the classification result from one state to the other. In the case of a positive polarity value (e.g., "+1"), a True or False classification result will be output as it is without change in the classification result. As a result, the detection window image is classified as containing text when the calculated sum of oriented gradients exceeds the threshold. In the case of a negative polarity value (e.g., "−1"), a True or False classification result will be changed to the opposite classification result for output. Accordingly, the detection window image will be classified as containing text when the calculated sum of oriented gradients does not exceeds the threshold.

The SOG classifier 306 further includes a determinator 640 configured to determine whether the detection window image contains text based on the classification results (T/F) of the detection window image by the weak classifiers 620 to 624. The determinator 640 is further configured to combine the classification results of the detection window image by the weak classifiers 620 to 624. For example, the combination of the classification results may be a sum of the numbers of a classification category (e.g., T or F) of the detection window image by the weak classifiers 620 to 624. The determinator 640 may also be configured with a threshold for the sum of the numbers of the classification category. If the sum of the numbers of classification category is greater than the threshold, the detection window image is determined to contain text, and a True value (T) is output to the SOG determination unit 308. Otherwise, the detection window image is determined not to contain text and a False value (F) is output to the SOG determination unit 308.

In another embodiment, each weak classifier 620 to 624 is configured to output a value "1" when a detection window image is classified as containing text, or a value "0" when a detection window image is classified as not containing text. Further, each weak classifier 620 to 624 may be configured with a weak classifier weight $\alpha_w$ which is applied to the output value. The assigned weak classifier weight $\alpha_w$ may be determined according to an accuracy or error rate in classifying sample images, which will be described in more detail below. Based on such determination, the output value of each classifier 620 to 624 is weighted by multiplying the corresponding weak classifier weight $\alpha_w$. Weighting the output of each classifier according to its accuracy or error rate allows greater weights to be given to more accurate classifiers and less weights to be given to less accurate classifiers. In the case of using weighted output values, the determinator 640 determines whether the detection window image contains text based on the sum of the weighted output values from the weak classifiers 620 to 624.

Figure 7:
FIG. 7 illustrates exemplary portions of oriented gradient images corresponding to an exemplary detection window image in location and size.
Figure 7:
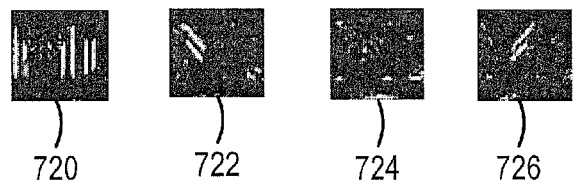

FIG. 7 shows an exemplary detection window image 522, and exemplary portions 720, 722, 724, and 726 of the four oriented gradient images 440, 442, 444, and 446 corresponding to the detection window image 522 in size and location. The portions 720, 722, 724, and 726 of the oriented gradient images have Orientations 0 to 3, respectively. Each weak classifier 620 to 624 receives one of the portions of the four oriented gradient images matching its predetermined orientation.

Figure 8:
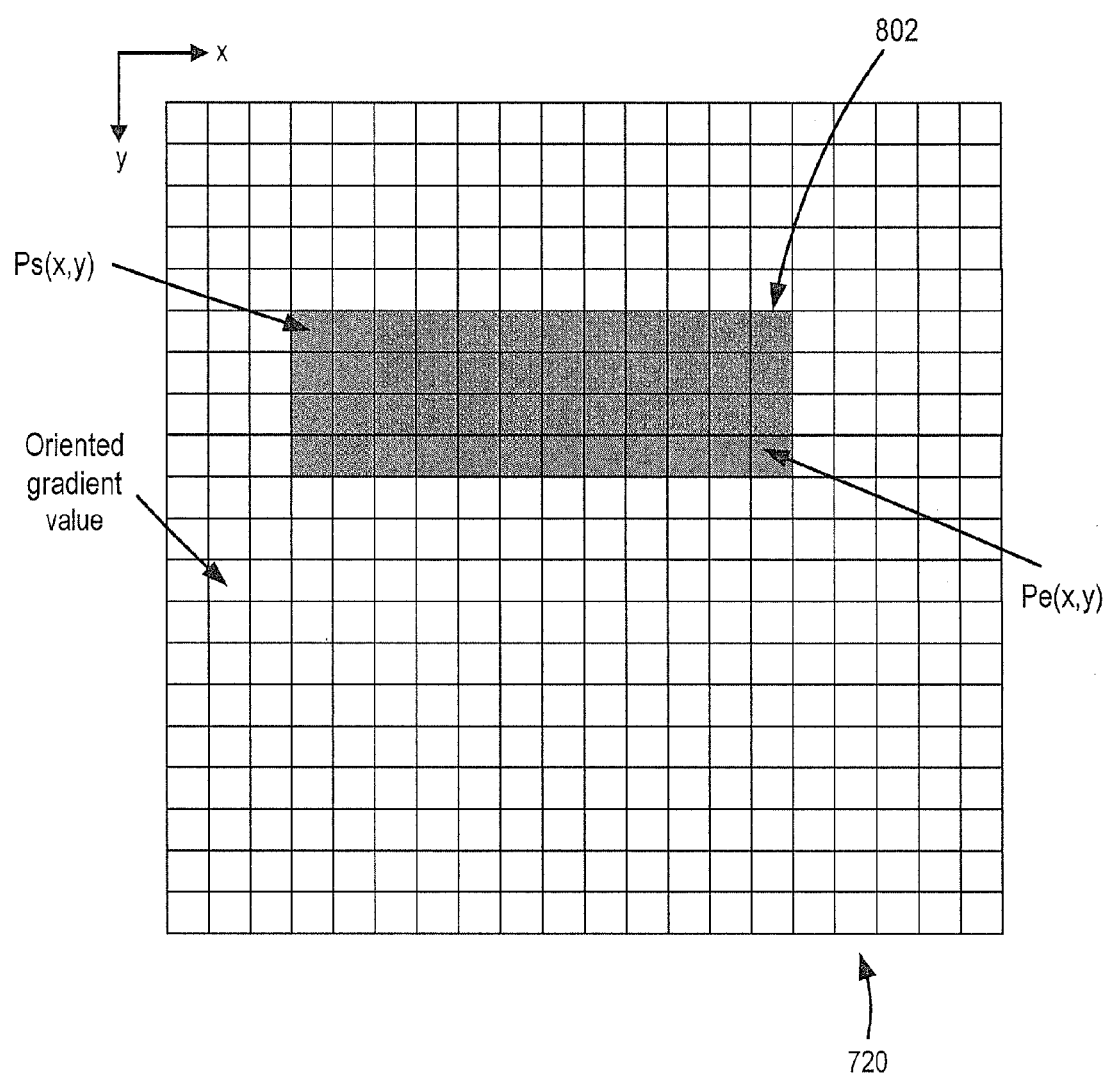
FIG. 8 shows an exemplary region in a portion of oriented gradient images corresponding to an exemplary detection window image in location and size.

FIG. 8 shows a pixel level view of the exemplary portion 720 of the oriented gradient image 440 including an exemplary region 802 for which a sum of oriented gradients is calculated according to one embodiment. The region 802 is identified by x and y coordinates of a start pixel $P_s(x, y)$ and an end pixel $P_e(x, y)$. In the illustrated region 802, the parameters defining the region 802 include the coordinates of the start pixel $P_s(4, 6)$ and the coordinates of the end pixel $P_e(15, 9)$. In other embodiments, the parameters defining a region may also include a size of the region. In this case, the region parameters may be defined by the coordinates of the start pixel $P_s(4, 6)$ and the size of the region 802 (e.g., 12 by 4 pixels). Although the portion 720 of the oriented gradient image 440 including the region 802 is illustrated, it should be noted that each classifier may operate on its predetermined region in a portion of an oriented gradient image corresponding to its predetermined orientation.

Figure 9:
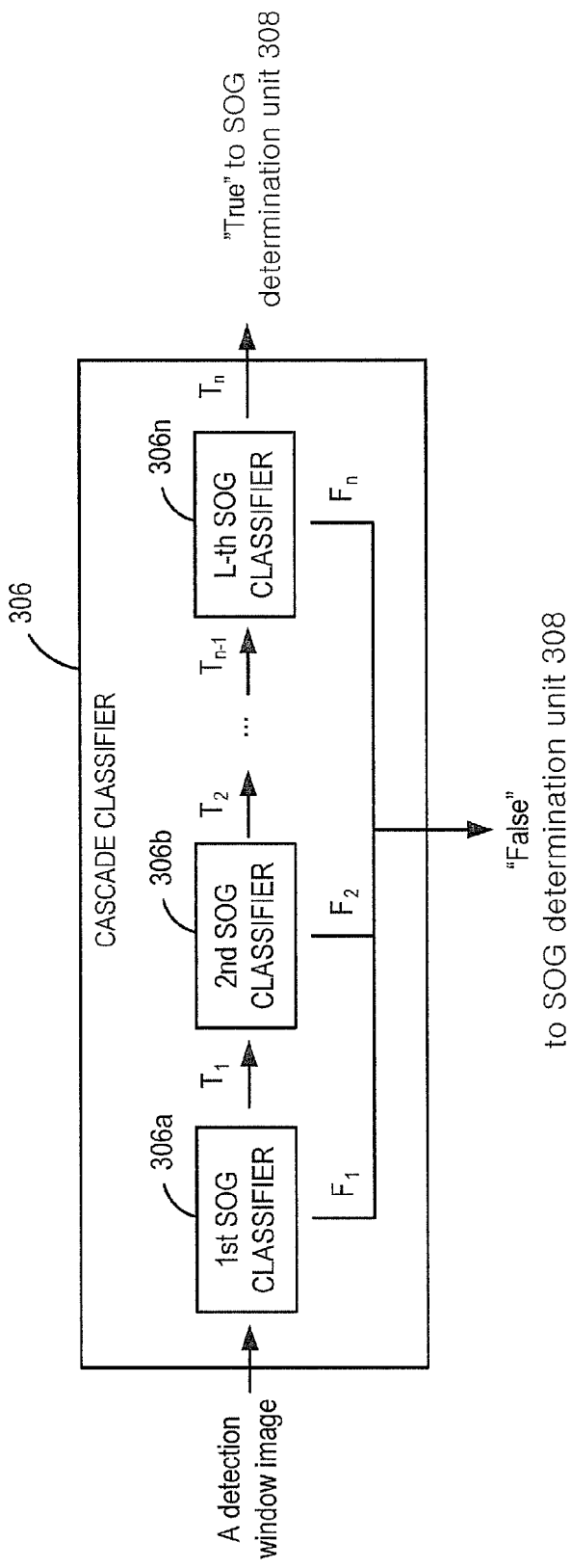
FIG. 9 illustrates a schematic block diagram of a SOG classifier including a cascade of classifiers for classifying detection window images according to one embodiment.

FIG. 9 illustrates a schematic block diagram of a cascade of SOG classifiers 306a to 306n as the SOG classifier 306 in FIG. 3 according to another embodiment. The SOG classifiers 306a to 306n are coupled in series to filter out detection window images (which do not contain text) in series. Each SOG classifier 306a to 306n has the same basic configuration as the SOG classifier 306 in FIG. 6 but may have different number of weak classifiers with differing parameter values. In this configuration, each of the SOG classifiers 306a to 306n sequentially determines whether a detection window image contains text in the similar manner as the SOG classifier 306 described above with reference to FIG. 6. In this chain of the SOG classifiers 306a to 306n, a detection window image is provided to the first SOG classifier 306a, which classifies whether the detection window image contains text by outputting a True or False value. In the case of a True output value, the second SOG classifier 306b receives the True value and proceeds to classify whether the detection window image contains text based on a different set of weak classifiers with differing parameter values that are configured to further verify whether the detection window image contains text. The second SOG classifier 306b then outputs a True value if it determines that the detection window image contains text. However, if any of the SOG classifiers 306a to 306n determines that the detection window image does not contain text (i.e., a False output value), the process terminates for the detection window image and the False value is immediately output to the SOG determination unit 308. When the outputs of all the SOG classifiers 306a to 306n are True, the final classification result True is output to the SOG determination unit 308. In this manner, each SOG classifier 306a to 306n filters out detection window images that do not contain text according to different criteria to provide more accurate classification results.

Figures 10A, 10B:
FIGS. 10A and 10B show exemplary learning sample images of a text image and a non-text image, respectively, that can be used in generating weak classifiers.

According to some embodiments, weak classifiers may be generated based on a set of learning sample images known to contain text and another set of learning sample images known not to contain text. FIGS. 10A and 1013 show an exemplary set of learning sample images 1002 containing text and an exemplary set of learning sample images 1004 not containing text, respectively, that can be used in generating weak classifiers. The sample images 1002 and 1004 are gray level images and include a plurality of sample images represented by rectangular images. For example, each rectangular image in the sample images 1002 and 1004 may represent a 20 by 20 pixel image, and has the same size as the detection window 540.

Each rectangular sample image includes a tag indicating whether the sample image is a positive sample image containing text or a negative sample image not containing text. For example, a tag indicating a positive sample image may be "1" while a tag indicating a negative sample image may be "0." The tags are used to verify whether candidate weak classifiers correctly classify the learning sample images as discussed in more detail below.

Figure 11:
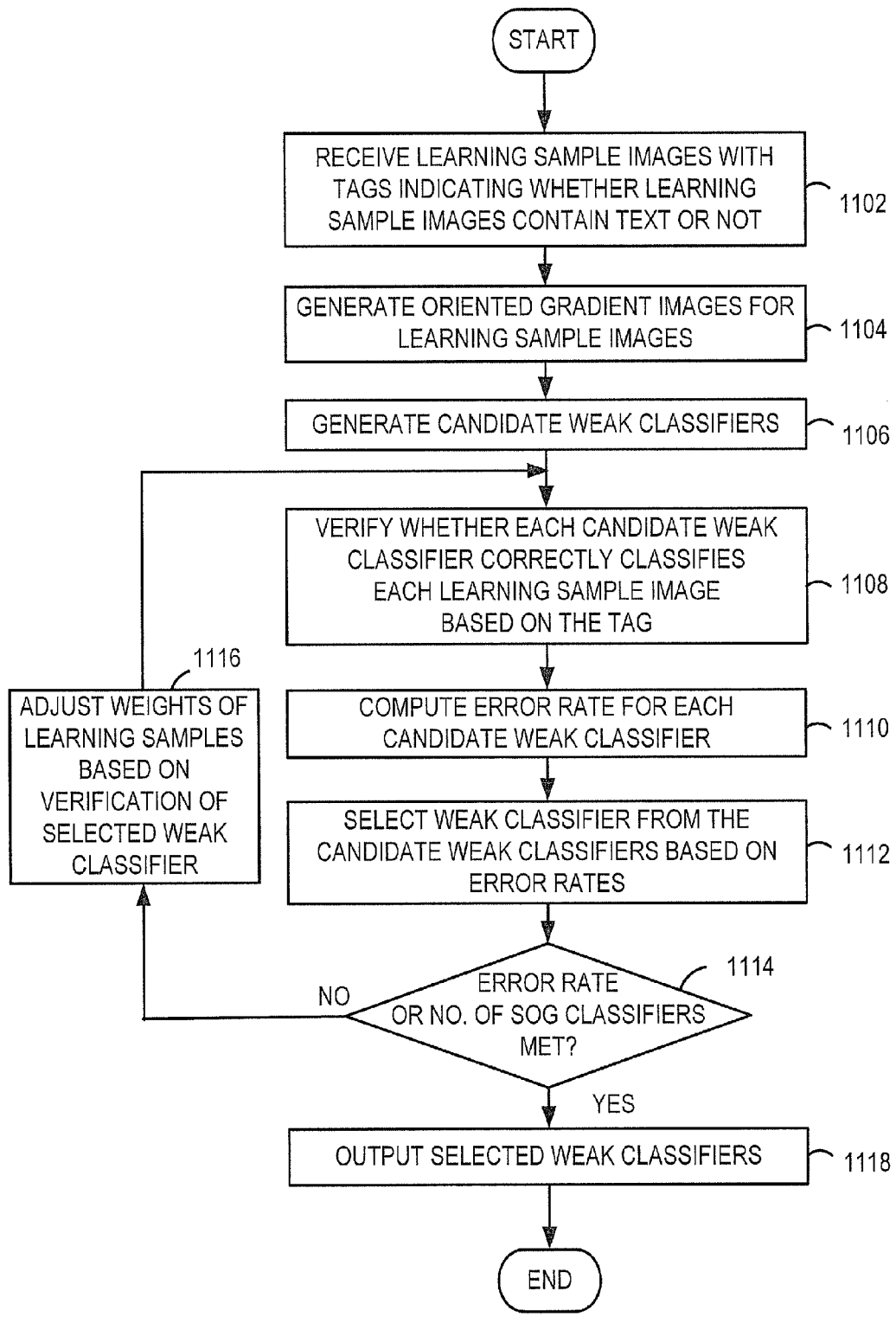
FIG. 11 is a flowchart of a method for generating weak classifiers of a SOG classifier according to one embodiment.

FIG. 11 is a flowchart of a method for generating weak classifiers of the SOG classifier 306 according to one embodiment. In this method, a set of learning sample images with tags, which indicate whether learning sample images contain text or not, is initially received at 1102. In some embodiments, a weight may be associated with each learning sample image. A sample image weight is initially assigned a particular value for all positive sample images and another value for all negative sample images. The weight for the positive sample images and the weight for the negative sample images may be determined according to the number of positive sample images and the negative sample images, respectively. For example, an initial weight for negative sample images is $$\frac{1}{2m},$$

where m is the number of the negative sample images, and an initial weight of the positive sample images is $$\frac{1}{2l},$$

where l is the number of the positive sample images. The initial weight $w_i$ of an i-th learning sample image is then normalized as follows:

$$w_i \leftarrow \frac{w_i}{\sum_{j=1}^{n} w_j} \quad [4]$$

where n refers to the number of the learning sample images.

After receiving the learning sample images, a set of oriented gradient images for each learning sample image is generated at 1104. The oriented gradient images may be generated for the learning sample images in the same manner as described above with reference to FIGS. 4A to 4D. For example, for each learning sample image, four oriented gradient images are generated with different orientations such as Orientations 0 to 3 as illustrated in FIG. 4C.

Once the oriented gradient images have been generated, candidate weak classifiers are generated based on the learning sample images at 1106. The candidate weak classifiers refer to weak classifiers configured with all possible combinations of all predetermined orientations and regions in the oriented gradient images. Each candidate weak classifier is further configured with a threshold and a parameter which are optimized for the classification based on its predetermined orientation and region, which will be described in detail below. In this context, the predetermined orientations may be the four orientations, Orientations 0 to 3, as described above with reference to FIG. 4C. The predetermined regions may include all possible regions in the oriented gradient images of a learning sample image. If the regions have a rectangular shape and the learning sample images has a size of n×m pixels, the number of the regions $N_R$ may be determined as follows:

$$N_R = \sum_{i=1}^{n} i \times \sum_{j=1}^{m} j \qquad [5]$$

For example, when the size of the learning sample images is 20 by 20 pixels, there is a total of 44,100 regions for each oriented gradient image. Thus, the total number of the candidate weak classifiers generated equals the number of all possible combinations of all orientation parameters and all region parameters. In this case, the number of candidate weak classifiers is as follows:

$$N_{candidate\_w} = N_o \times N_R \qquad [6]$$

where $N_o$ refers to the number of orientations. Given four orientations and 44,100 regions, a total of 176,400 candidate weak classifiers is generated. As described above, the total number of candidate weak classifiers may vary depending on the size of the learning sample images and the number of orientations.

After generating the candidate weak classifiers, it is verified whether each candidate weak classifier correctly classifies each learning sample image based on the sample image's tag at 1108. The verification result may be calculated as follows:

$$v\_i = |C_{w\_i} - y_i| \qquad [7]$$

where $C_{w\_i}$ refers to a classification result for the i-th learning sample image by candidate weak classifier and $y_i$ refers to a tag of the i-th learning sample image. According to this equation, the verification result v_i is "0" if the classification is correct, and "1" if the classification is not correct.

Based on the verification results, an error rate for each candidate weak classifier is computed at 1110. For example, an error rate $\epsilon_w$ of a candidate weak classifier may be computed as follows:

$$\epsilon_w = \sum_i v\_i \times w_i \qquad [8]$$

where i is an index of the learning sample images, v_i refers to a verification result for the i-th learning sample image by the candidate weak classifier, and $w_i$ is a weight of the i-th learning sample image. In this manner, the error rates are computed for all candidate weak classifiers.

Once the error rates have been obtained for the candidate weak classifiers, a weak classifier to be included in the SOG weak classifier 306 is selected from the candidate weak classifiers based on the error rates at 1112. In one embodiment, a candidate weak classifier with the lowest error rate may be selected as the weak classifier. In some embodiments, the selected candidate weak classifier may be added to a set of weak classifiers to be included in the SOG classifier.

The selected weak classifier may be assigned a weak classifier weight $\alpha_w$, which may be determined based on the error rate calculated at 1110. For example, the weak classifier weight $\alpha_w$ may be calculated as follows:

$$\alpha_w = \log \frac{1}{\beta} \qquad [9]$$

$$\beta = \frac{\epsilon_w}{1 - \epsilon_w} \qquad [10]$$

where $\epsilon_w$ refers to an error rate of the selected weak classifier calculated at 1110.

After selecting the weak classifier, it is determined whether the weak classifier generation process is to be terminated based on a termination condition at 1114. For example, the process can be terminated when a predetermined number of weak classifiers have been selected from the candidate weak classifiers. In other embodiments, the process may be also terminated when a set of weak classifiers has been selected to ensure a specified upper limit error rate or a specified lower limit accuracy rate. For example, the termination condition may define a lower limit accuracy rate (e.g., 99%) of correctly classified positive sample images and/or a lower limit accuracy rate (e.g., 50%) of correctly classified negative sample images. In this case, an error rate or an accuracy rate is calculated for the SOG classifier including the weak classifiers selected thus far.

If the termination condition is not met at 1114, the method proceeds to 1116 where the weights of the learning sample images are adjusted based on the verification results of the selected weak classifier. In this process, the weights of learning sample images that are correctly classified by the selected candidate weak classifier are decreased relative to the weights of learning sample images that are not correctly classified by the selected candidate weak classifier. For example, a weight $w_i$ of an i-th learning sample image may be adjusted to a weight $w_i'$ as follows:

$$w_i' \leftarrow w_i \beta^{1-e} \qquad [11]$$

where e is set to a "0" if the i-th learning sample image is correctly classified, and e is set to a "1" if the i-th learning sample image is not correctly classified. $\beta$ is calculated according to Expression [10]. The error rate calculated at 1110 may be used for the error rate $\epsilon_w$ in Expression [10]. According to Expression [11], the weights of the incorrectly classified learning sample images are maintained while the weights of the correctly classified learning sample images are reduced. In some embodiments, the adjusted weights may be normalized according to Expression [4] described above. After adjusting the weights at 1116, the method proceeds back to 1108 to verify whether each candidate weak classifier correctly classifies each learning sample image with the adjusted weights. If the termination condition is met at 1114, the selected set of weak classifiers is output to be included in the SOG classifier 306 at 1118.

Figure 12:
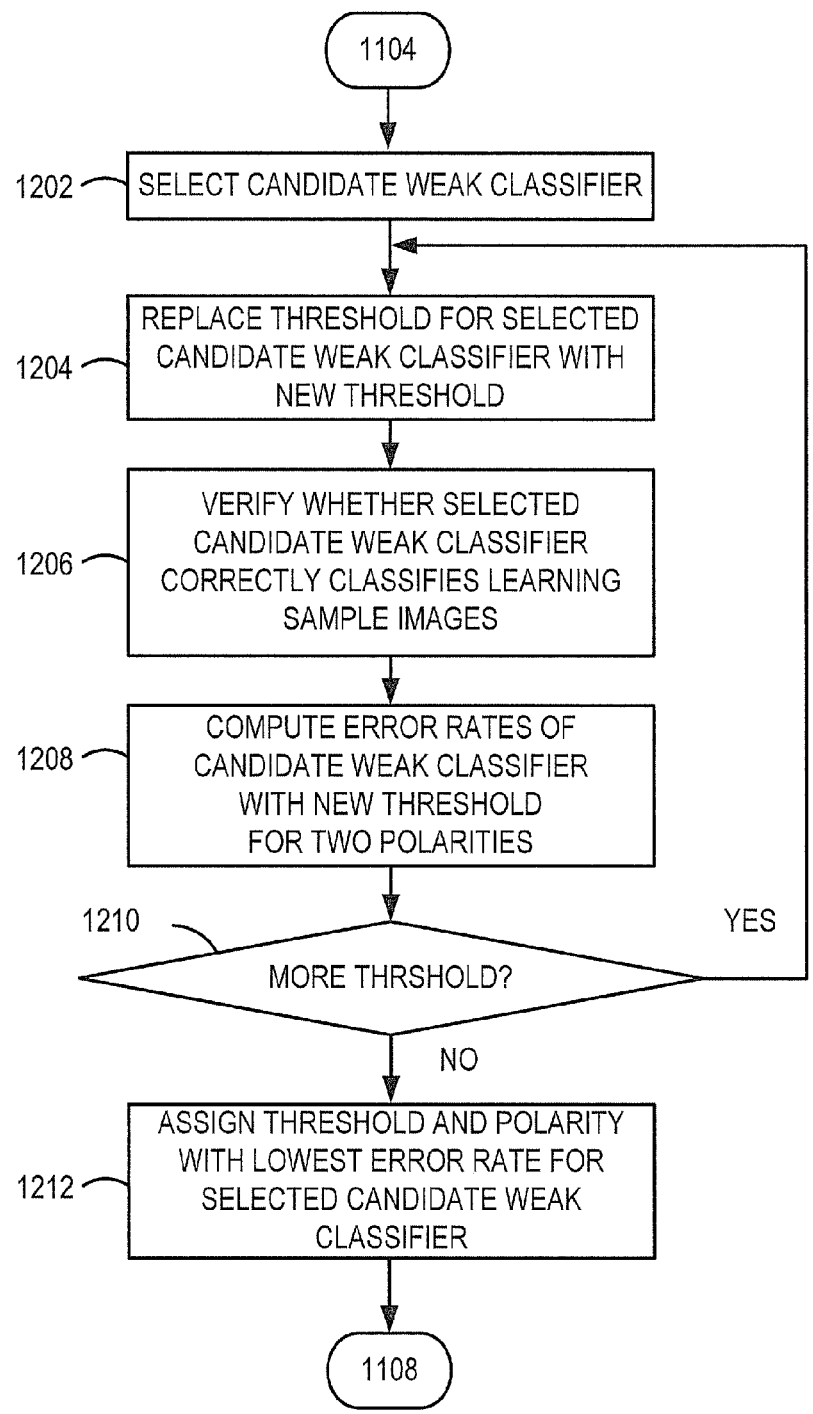
FIG. 12 is a flowchart of a method for generating candidate weak classifiers that can be used in generating weak classifiers according to one embodiment.

FIG. 12 is a more detailed flowchart of a method for generating candidate weak classifiers in 1106 of FIG. 11 that can be used in generating weak classifiers according to one embodiment. Initially, one of the candidate weak classifiers is selected at 1202. The selected candidate weak classifier includes a predetermined orientation, a predetermined region, an initial threshold for a sum of oriented gradients, and an initial polarity (e.g., "+1"). The initial threshold is then replaced with a new threshold in a threshold range for the selected candidate weak classifier at 1204. The threshold range may be determined by the smallest and largest sums of oriented gradients calculated by the selected candidate weak classifier from the learning sample images using the predetermined orientation and region. In determining the new threshold, a plurality of candidate thresholds is calculated between the smallest and largest sums of oriented gradients at specified intervals.

For the new threshold, it is verified whether the selected candidate weak classifier correctly classifies each learning sample image at 1206. In this process, the selected candidate weak classifier classifies the learning sample images by comparing the sums of oriented gradients calculated from the learning sample images with the new threshold. In some embodiments, based on the initial polarity (e.g., "+1"), the selected candidate weak classifier classifies the learning sample images as containing text if the sum of oriented gradients exceeds the threshold, and classifies the learning sample images as not containing text if the sum of oriented gradients does not exceed the threshold. Then, the initial polarity is switched to the other polarity (e.g., "−1"), and the selected candidate weak classifier classifies the learning sample images as containing text if the sum of oriented gradients does not exceed the threshold, and classifies the learning sample images as not containing text if the sum of oriented gradients exceeds the threshold. Further, the classifications of learning sample images are compared with the tags of the corresponding learning sample images to verify whether the classifications are correct. In some embodiments, the classification results may be a "1" to indicate a text image, and a "0" to indicate a non-text image. The verification results v_i may be calculated from the classification results using Equation [7].

Once the learning sample images have been classified, error rates of the selected candidate weak classifier with the new threshold for the two polarities are computed based on the verification results v_i at 1208. For example, the error rate $\varepsilon_{w\_th}$ may be calculated by summing the verification results v_i for all learning sample images, as follows:

$$\varepsilon_{w\_th} = \sum_i w_i \times v\_i \quad [12]$$

where i refers to an index for the learning sample images.

After determining the error rates for the threshold, it is determined whether another threshold is selectable from the candidate thresholds at 1210. That is, it is determined whether the error rates have been calculated for all candidate thresholds. If not, the method proceeds back to 1204 where the old threshold is replaced with a new candidate threshold. On the other hand, if no further threshold is selectable (i.e., the error rates have been calculated for all candidate thresholds), the candidate threshold and the polarity with the lowest error rate are assigned as the threshold and polarity for the selected candidate weak classifier at 1212.

In some embodiments, the weak classifier generation process as described above may also be implemented by suitably adapting an AdaBoost algorithm.

Figure 13:
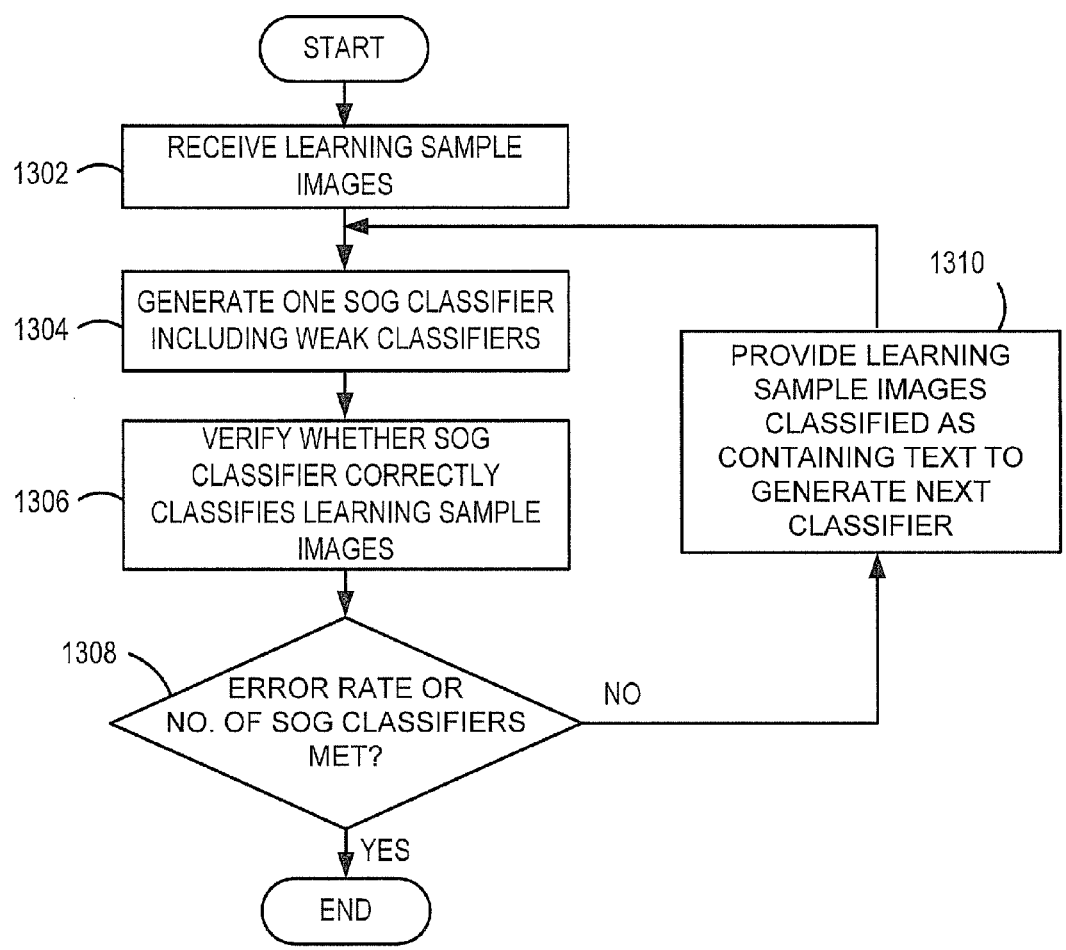
FIG. 13 is a flowchart of a method for generating weak classifiers of a cascade of classifiers according to one embodiment.

FIG. 13 is a flowchart of a method for generating weak classifiers for the cascade of SOG classifiers 306 according to one embodiment. Initially, a set of learning sample images as described above is received at 1302. Weak classifiers to be included in the first SOG classifier 306a are generated using the learning sample images at 1304 in a similar manner as described above with reference to FIG. 11. Then, it is verified whether the first SOG classifier 306a including the generated weak classifiers correctly classifies the learning sample images by comparing the classification of each learning sample image by the first SOG classifier 306a with the tag at 1306. For example, the first SOG classifier 306a determines whether each learning sample image is a text image or not and compares the determination result with the tag for the verification.

After verifying whether the first SOG classifier 306a correctly classifies the learning sample images, it is determined whether an error rate or the number of SOG classifiers selected so far to be included in the cascade SOG classifier 306 is met at 1308. If both conditions are not met at 1308, the method proceeds to 1310 where the learning sample images classified as containing text at 1306 are provided to generate a next SOG classifier 306b at 1304. If either condition is met at 1308, the cascade SOG classifier generation is terminated.

As described above, the weak classifier generation is performed on different sets of learning samples for different SOG classifiers included in the cascade SOG classifier 306. That is, the weak classifiers for a SOG classifier are generated based on only the learning sample images that are classified as a text image at the preceding SOG classifier. Accordingly, different weak classifiers are generated for different SOG classifiers in the cascade SOG classifier 306. In some embodiments, generating weak classifiers for the cascade SOG classifier 306 may be carried out by training each SOG classifier in the cascade SOG classifier 306 according to a boosting algorithm.

Figure 14:
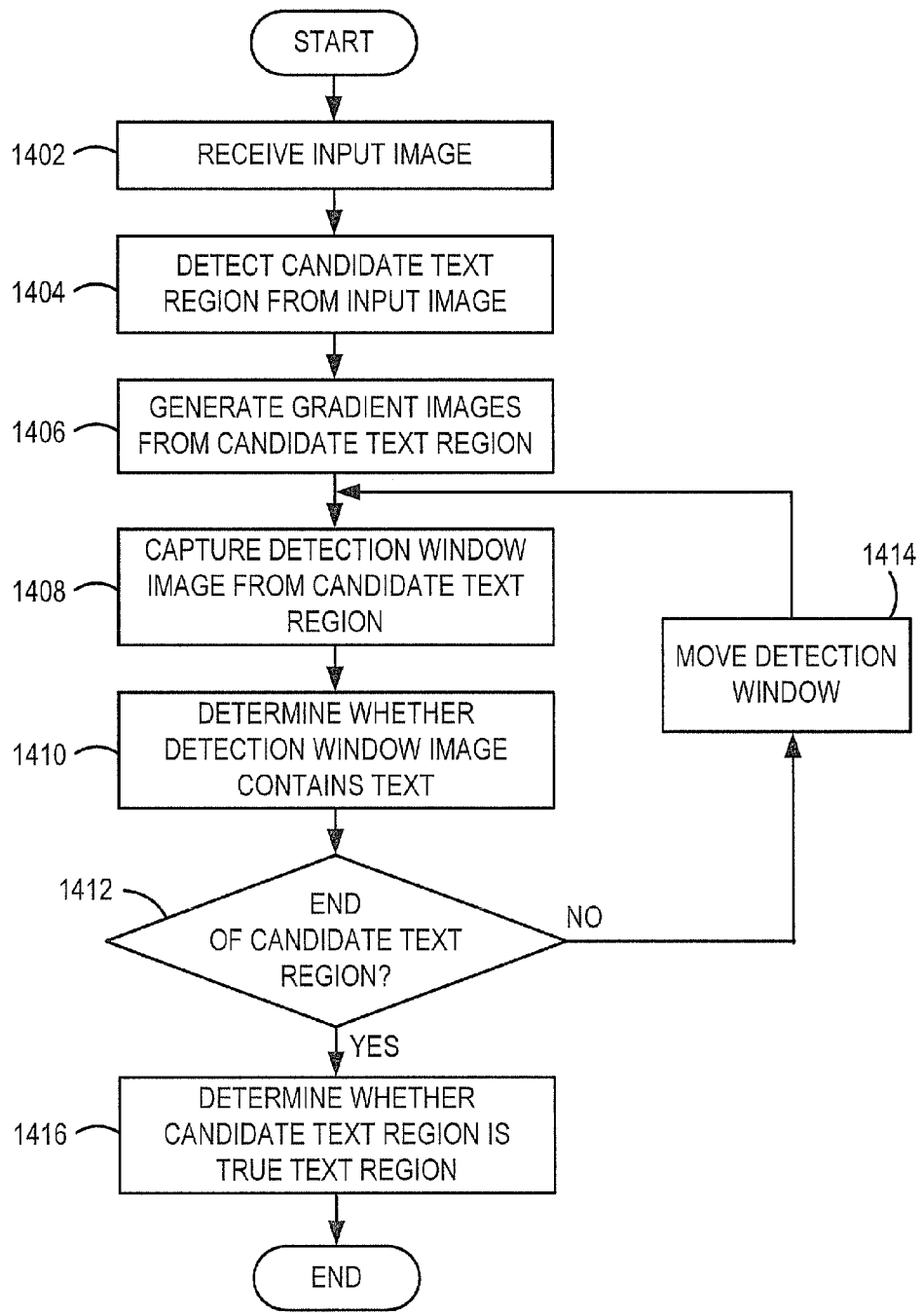
FIG. 14 is a flowchart of a method for detecting a text region in an input image according to one embodiment.

FIG. 14 is a flowchart of a method, performed by the text region detection system 100, for detecting a text region in an input image according to one embodiment. In this method, the image receiving unit 120 receives an input image at 1402, by capturing the input image or receiving the input image from another device. The candidate text region detector 140 detects one or more candidate text regions from the input image at 1404. As described above, the candidate text region detector 140 may rectify and/or resize the candidate text images as necessary.

The gradient image generator 302 of the verification unit 160 generates one or more gradient images of the candidate text region according to one or more predetermined orientations and provides the oriented gradient images to the SOG classifier 306 at 1406. For example, the gradient image generator 302 may generate four oriented gradient images according to four orientations, Orientation 0 to 3.

The detection window locator 304 captures a detection window image from the candidate text region at 1408 at the beginning of the candidate text region. At 1410, the SOG classifier 306 determines whether the detection window image contains text. Then, the detection window locator 304 determines whether the detection window 540 has reached the end of the candidate text region at 1412. If the detection window 540 has not reached the end of the candidate text region, the method proceeds to 1414 where the detection window locator 304 moves the detection window 540 by a predetermined interval so that a new detection window image is captured at 1408.

If the detection window 540 has reached the end of the candidate text region at 1412, the method proceeds to 1416, where the SOG determination unit 308 determines whether the candidate text region is a true text region based on the determinations of the detection window images by the SOG classifier 306. The SOG determination unit 308 may determine the candidate text region as a true text region when a certain number of detection window images are determined as containing text by the SOG classifier 306.

Figure 15:
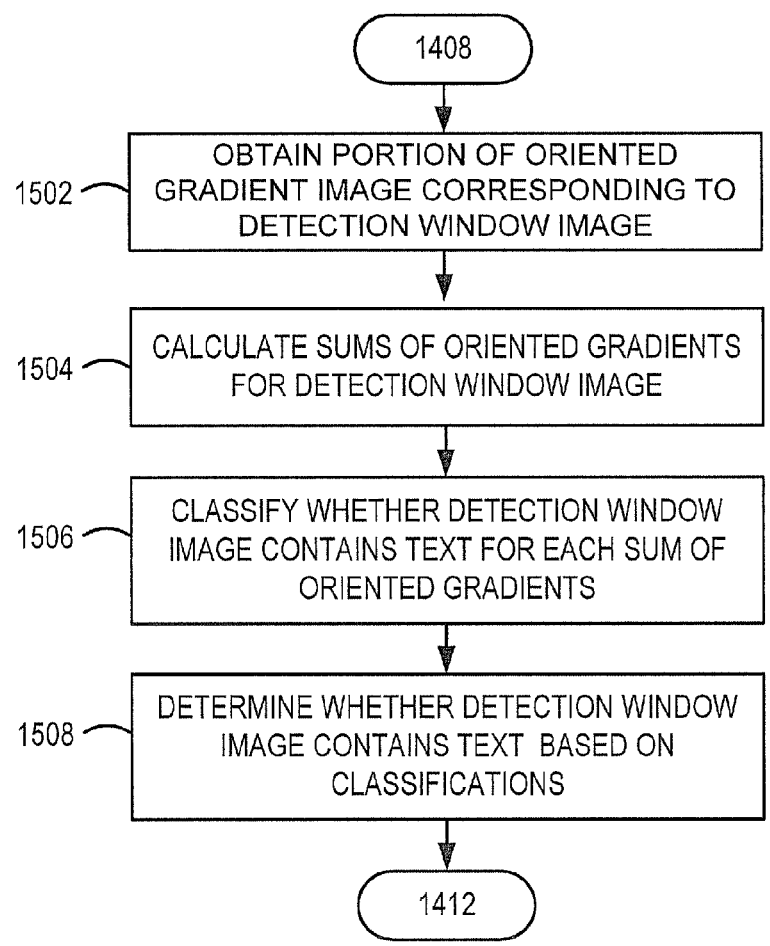
FIG. 15 is a flowchart of a method for determining whether a detection window image in a candidate text region contains text according to one embodiment.

FIG. 15 is a more detailed flowchart of 1410 of FIG. 14 for determining whether a detection window image in a candidate text region contains text according to one embodiment. Initially, at 1502, each weak classifier 620 to 624 obtains a portion of an oriented gradient image corresponding to its predetermined orientation, where the portion corresponds to the detection window image in size and location. Each weak classifier 620 to 624 calculates a sum of oriented gradients for its predetermined region in the portion of the oriented gradient image at 1504.

Each weak classifier 620 to 624 then classifies whether the detection window image contains text at 1506 by comparing the calculated sum of oriented gradients with the threshold. When the associated polarity is "+1," the detection window image is classified as containing text if the sum of oriented gradients exceeds the threshold, and classified as not containing text if the sum of oriented gradients does not exceed the threshold. On the other hand, when the polarity is "−1," the detection window image is classified as containing text if the sum of oriented gradients does not exceed the threshold, and classified as not containing text if the sum of oriented gradients exceeds the threshold. The determinator 640 determines whether the detection window image contains text based on the classification results of the weak classifiers 620 to 624 at 1508.

Figure 16:
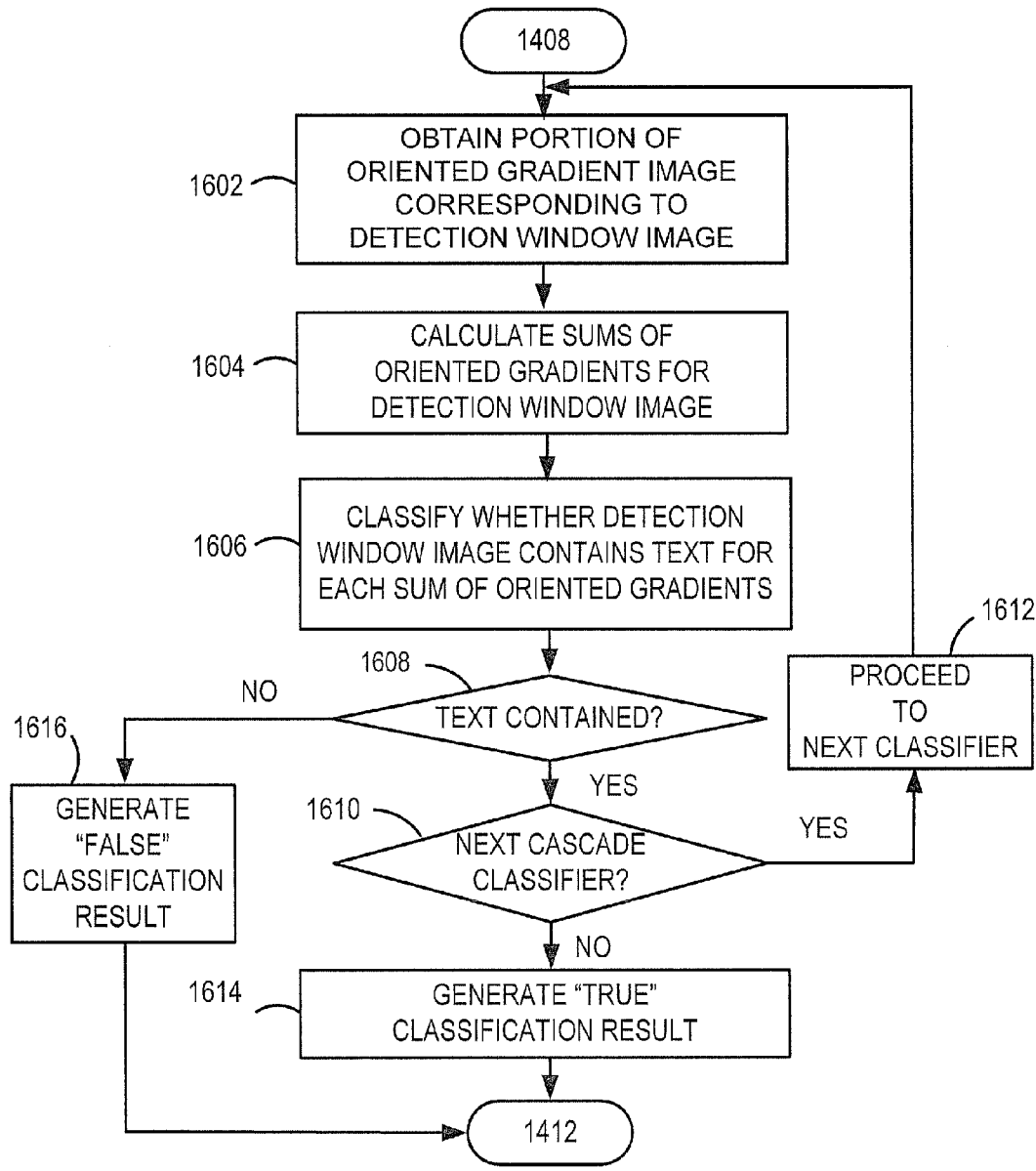
FIG. 16 is a flowchart of a method for determining whether a detection window image in a candidate text region contains text using a cascade of classifiers according to another embodiment.

FIG. 16 is a more detailed flowchart of 1410 for determining whether a detection window image in a candidate text region contains text using the SOG classifier 306 including the cascade of SOG classifiers 306a to 306n according to another embodiment. Initially, at 1602, each weak classifier 620 to 624 in the first SOG classifier 306a obtains a portion of an oriented gradient image corresponding to its predetermined orientation, where the portion corresponds to the detection window image in size and location. Then, each of the weak classifiers 620 to 624 calculates a sum of oriented gradients for its predetermined region in the portion of the oriented gradient image at 1604. Each of the weak classifiers 620 to 624 then classifies whether the detection window image contains text by comparing the sum of oriented gradients and its threshold at 1606. At 1608, the determinator 640 in the first SOG classifier 306a determines whether each detection window image contains text based on the classification results of the weak classifiers 620 to 624.

If the detection window image is determined to contain text by the first SOG classifier 306a at 1608, the method proceeds to 1610 where it is further determined whether there is a next SOG classifier in the cascade of SOG classifiers 306. If there is a next SOG classifier, the method proceeds to the next SOG classifier at 1612 and receive portions of the oriented gradient images for the next SOG classifier at 1602. Thus, when the detection window image is determined as containing text without further SOG classifiers, the SOG classifier 306 outputs a True value to indicate that the detection window image contains text at 1614. If the detection window image is determined not to contain text by any one of the SOG classifiers in the cascade of SOG classifiers at 1608, the SOG classifier 306 outputs a False value to indicate that the detection window image does not contain text at 1616.

Figure 17:
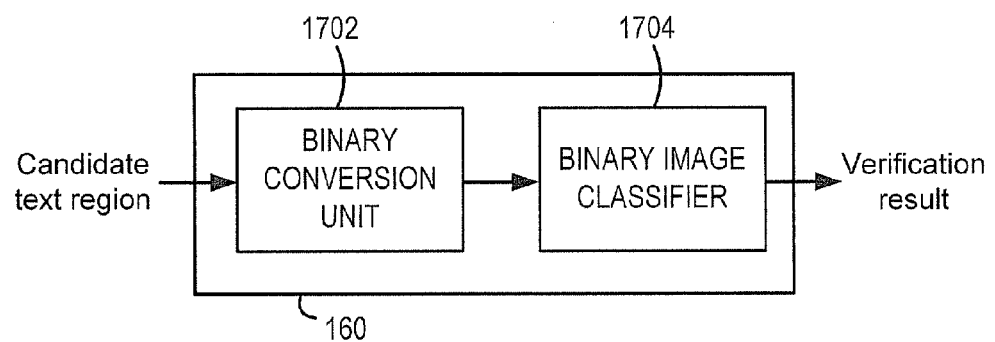
FIG. 17 is a schematic block diagram of a verification unit for verifying a rectified candidate text region according to another embodiment.

FIG. 17 is a schematic block diagram of the verification unit 160 for verifying a rectified candidate text region according to another embodiment. Each verification unit 160 illustrated in FIGS. 3 and 17 may be used alone or in combination with each other, for example, in series or in parallel, to improve accuracy of verification of a candidate text region.

The verification unit 160 includes a binary conversion unit 1702 and a binary image classifier 1704. The binary conversion unit 1702 is configured to convert the candidate text region into a binary image. For example, the binary conversion unit 1702 initially estimates a color in each pixel of the candidate text region based on a blob color in the candidate text region. A connected component is then extracted from the candidate text region to estimate an average color of the connected component as a text color. Further, an average background color is estimated based on an average color of the entire candidate text region.

The binary conversion unit 1702 then converts the candidate text region into the binary image based on the color distance between the estimated average text color and the estimated average background color. In some embodiments, the binary conversion unit 1702 may compare the color of each pixel with both the average text color and the average background color to determine whether the color of each pixel is closer to the average text color or closer to the average background color. When the color of each pixel is closer to the average background color, the corresponding pixel may be assigned a binary value (e.g., "0") corresponding to the background. On the other hand, when the color of each pixel is closer to the average text color, the corresponding pixel may be assigned a binary value (e.g., "1") corresponding to text. Thus, the binary conversion unit 1702 generates the binary image including pixels with the binary values corresponding to text or background.

The binary image classifier 1704 is configured to split the binary image into a plurality of blocks and verify whether the candidate text region is a true text region based on one or more features calculated from the blocks. The features include at least one of the number of white pixels C(w), the number of black pixels C(b), the number of white pixel to black pixel transitions C(w_b), and the number of black pixel to white pixel transitions C(b_w). In determining the number of pixel transitions C(w_b) or C(b_w), the pixel transitions are counted in specified directions such as from left to right and from top to bottom.

The binary image classifier 1704 uses a binary feature-based classifier function $F(\vec{f}_{bin})$, which has an input feature vector $\vec{f}_{bin}$ representing the above features as components, to calculate a likelihood that the binary image block contains text. The binary feature-based classifier function $F(\vec{f}_{bin})$ receives the feature vector $\vec{f}_{bin}$ calculated for a block of the binary image and outputs a value in a range between "1" and "0." Within this range, the value "1" indicates that the block of the binary image contains text, while the value "0" indicates that the block of the binary mage does not contain text. As such, the output value indicates a likelihood that the block of the binary image contains text. Specifically, an output value closer to "1" indicates that the block of the binary image is more likely to contain text, while an output value closer to "0" indicates that the block of the binary image is more likely not to contain text. For each block in the binary image, the binary feature-based classifier function $F(\vec{f}_{bin})$ generates a value indicating a likelihood that the binary image block contains text.

Once the likelihood values have been calculated for the blocks in the binary image, the binary image classifier 1704 calculates an average sum of the likelihood values and determines whether the candidate text region is a true text region based the average sum of the values. For example, the average sum may be determined according to the following expression:

$$\frac{1}{|P|}\sum_{i \in P} F(\vec{f}_{bin\_i})  \quad [13]$$

where $F(\vec{f}_{bin\_i})$ refers to an output value of the binary feature-based classifier function with an input of a feature vector $\vec{f}_{bin\_i}$ for an i-th binary image block, and P refers to the number of the binary image blocks in the binary image. The candidate text region is then determined to be a true text region if the average sum exceeds a predetermined threshold value, and determined to be a non-text region if the average sum does not exceed the threshold value. The binary image classifier 1704 outputs the verification result for the candidate text region.

In one embodiment, the binary feature-based classifier function $F(\vec{f}_{bin\_i})$ is configured with an artificial neural network trained with sample images based on various optimization methods such as Rprop first-order optimization method and Levenberg-Marquardt method. The artificial neural network may be trained by using feature vectors calculated from the training sample images and their labels (e.g., "1" and "0," respectively). The artificial neural network thus trained is configured to output values in a range between "1" and "0" to indicate a likelihood of containing text.

Figure 18:
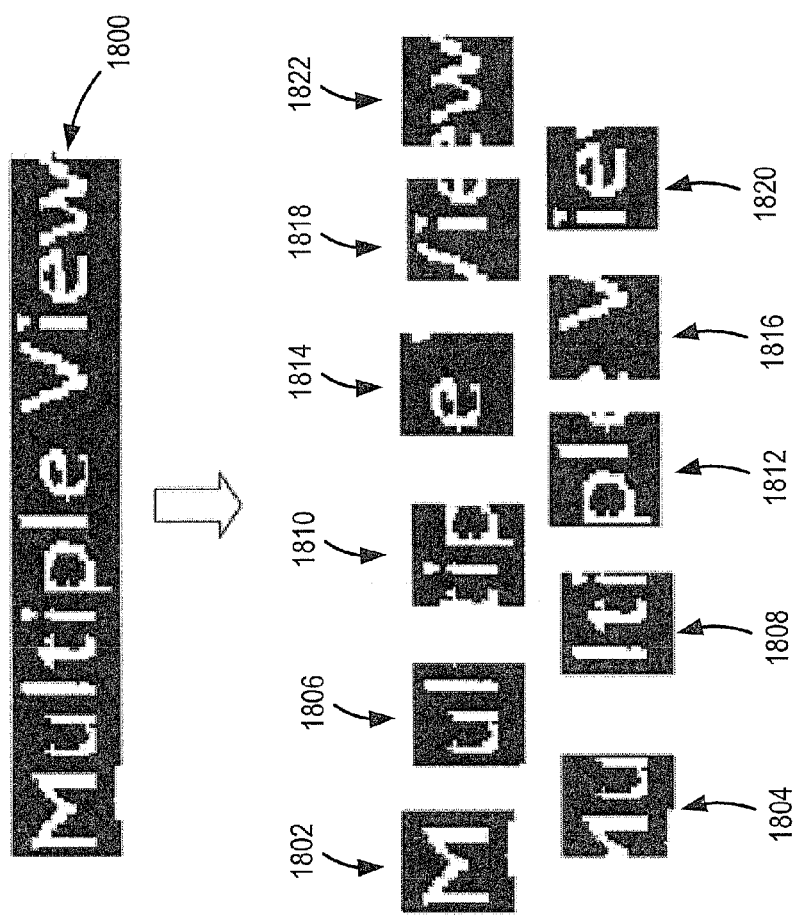
FIG. 18 illustrates an exemplary binary image of a candidate text region and a plurality of blocks of the binary image used in the verification unit illustrated in FIG. 17.

FIG. 18 illustrates an exemplary binary image 1800 of the candidate text region 280 and a plurality of blocks 1802 to 1822 of the binary image used for the binary image classifier 1704 according to one embodiment. As shown, the binary image 1800 is split into the blocks 1802 to 1822, each of which has the same size and overlaps partially with one or more adjacent blocks. The binary image classifier 1704 calculates the features described above from each binary image block and generates an output value indicating a likelihood that each binary image block contains text.

Figure 19A:
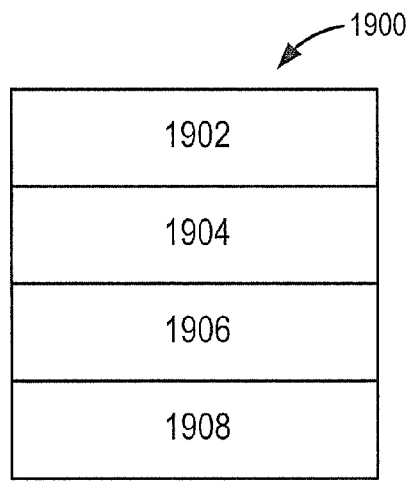
FIGS. 19A and 19B show examples of dividing a block of the binary image into sub-blocks according to one embodiment.
Figure 19B:
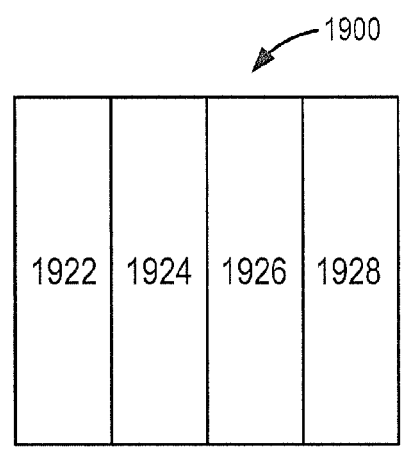

FIGS. 19A and 19B show an exemplary binary image block 1900 divided into a plurality of sub-blocks 1902 to 1908 and 1922 to 1928 according to one embodiment. The binary image classifier 1704 divides each binary image block such as the block 1900 into the sub-blocks 1902 to 1908 and 1922 to 1928 and calculates the features for the sub-blocks. Referring to FIG. 19A, the binary image block 1900 is divided into the four horizontal sub-blocks 1902 to 1908, which may have the same size. On the other hand, the binary image block 1900 in FIG. 19B is divided into the four vertical sub-blocks 1922 to 1928, which may have the same height and width.

Figure 20:
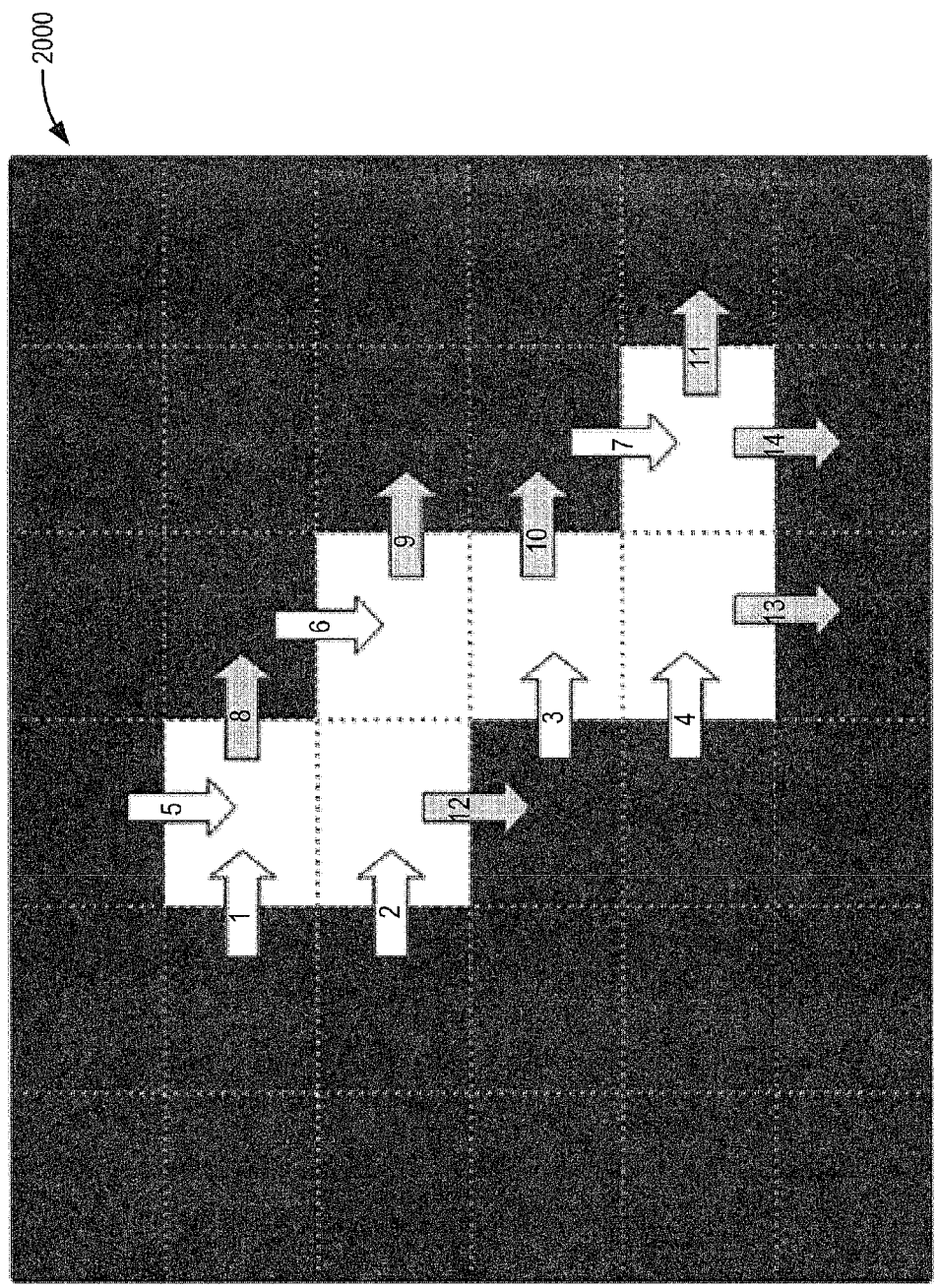
FIG. 20 shows an exemplary image for calculating features from a sub-block in a binary image block for use in classifications according to one embodiment.

FIG. 20 shows an exemplary sub-block 2000 of a binary image block for calculating the features in the binary image classifier 1704 according to one embodiment. The sub-block 2000 is shown with a size of 6 by 6 pixels, in which six pixels are white and thirty pixels are black. Thus, the number of white pixels C(w) and the number of black pixels C(b) are determined to be "6" and "30," respectively. Further, the sub-block 2000 includes seven black pixel to white pixel transitions (indicated by Arrows 1 to 7 in FIG. 20) and seven white pixel to black pixel transitions (indicated by Arrows 8 to 14 in FIG. 20). Thus, the number of white pixel to black pixel transitions C(w_b) and the number of black pixel to white pixel transitions C(b_w) are both determined to be "7."

In some embodiments, the features C(w), C(b), C(w_b), and C(b_w) may be calculated from all sub-blocks of a binary image block. For example, if the binary image block is divided into eight sub-blocks including four horizontal sub-blocks 1902 to 1908 and four horizontal sub-blocks 1922 to 1928 as shown in FIGS. 19A and 19B, the four features C(w), C(b), C(w_b), and C(b_w) may be calculated from each sub-block, and thus a total of thirty-two features are calculated from one binary image block. In this case, the features of the binary image block may be represented by a feature vector $\vec{f}_{bin}$ having 32 dimensions (i.e., components).

Alternatively, at least one of the features C(w), C(b), C(w_b), and C(b_w) may be calculated from at least some of the sub-blocks of the binary image block. For example, the features C(w), C(b), C(w_b), and C(b_w) may be calculated from the sub-blocks 1906, 1908, 1922, and 1928. In this case, the features of the binary image block may be represented by a feature vector $\vec{f}_{bin}$ having 16 dimensions. In some embodiments, features calculated from the sub-blocks may be different. For example, the features C(w) and C(b) are calculated from the sub-blocks 1906 and 1908, respectively, while the features C(w_b) and C(b_w) are calculated from the sub-blocks 1922 and 1928, respectively. In this case, the features of the binary image block may be represented by a feature vector $\vec{f}_{bin}$ having 4 dimensions.

Figure 21:
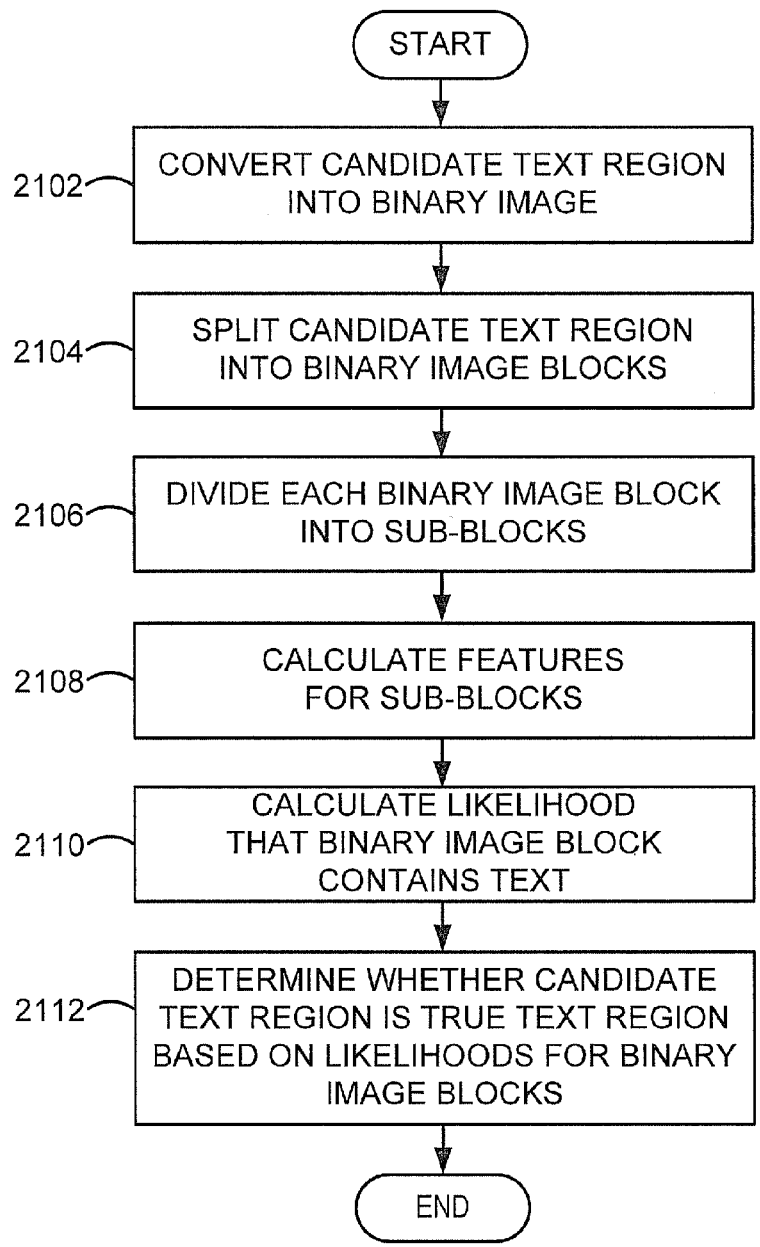
FIG. 21 is a flowchart of a method for detecting a text region in an input image based on classifications of binary image blocks according to one embodiment.

FIG. 21 is a flowchart of a method, performed by the verification unit 160 in FIG. 17, for detecting a text region in an input image based on classifications of binary image blocks according to one embodiment. Initially, the binary conversion unit 1702 converts the candidate text region into a binary image at 2102. Then, the binary image classifier 1704 splits the binary image into a plurality of binary image blocks at 2104. Once the binary image blocks have been obtained, the binary image classifier 1704 divides each binary image block into two or more sub-blocks at 2106.

The binary image classifier 1704 then calculates the features for the sub-blocks of each of the binary image blocks at 2108. The features may include at least one of the number of white pixels C(w), the number of black pixels C(b), the number of white pixel to black pixel transitions C(w_b), and the number of black pixel to white pixel transitions C(b_w) in each sub-block.

Based on the calculated features for each binary image block, the binary image classifier 1704 calculates a likelihood that the binary image block contains text at 2110. In this process, the binary image classifier 1704 calculates a likelihood that each binary image block contains text based on the features calculated for the sub-blocks of the binary image block. Given an input feature vector $\vec{f}_{bin}$ including the features calculated for the sub-blocks of the binary image block, the binary feature-based classifier function $F(\vec{f}_{bin})$ outputs a likelihood value in a range between "1" and "0" as described above.

The binary image classifier 1704 then determines whether the candidate text region is a true text region based on the likelihood values for the binary image blocks at 2112. In this determination process, the binary image classifier 1704 averages the likelihood values from the binary feature-based classifier function $F(\vec{f}_{bin})$ and determines the candidate text region as a text region if the average value exceeds a predetermined threshold value.

Figure 22:
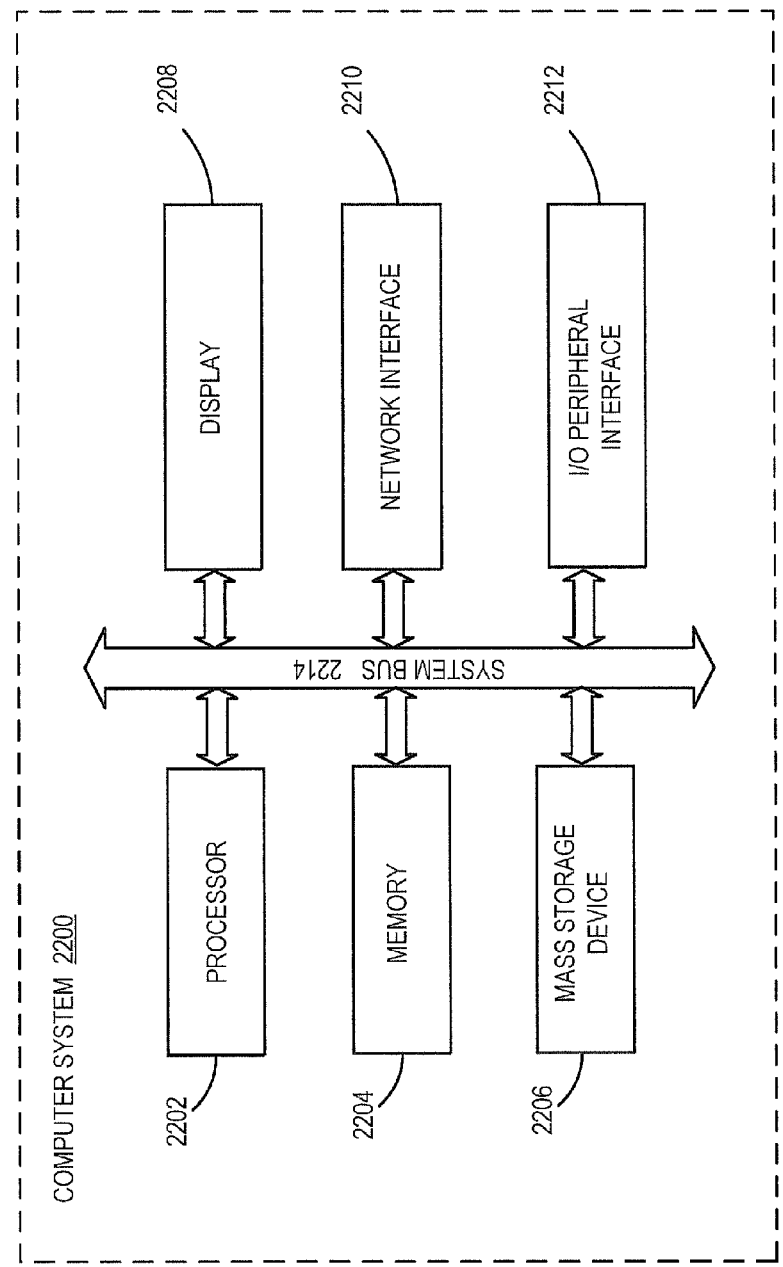
FIG. 22 illustrates is a block diagram of an exemplary computer system that is arranged for performing text region detection or generating weak classifiers of a SOG classifier according to one embodiment.

FIG. 22 is a block diagram illustrating an exemplary computer system 2200 in which various embodiments and methods described above may be implemented according to one embodiment. The computer system 2200 includes a processor 2202, a memory 2204, a mass storage device 2206, a display

2208, a network interface 2210, and an I/O peripheral interface 2212, which communicate with each other through a system bus 2214.

The mass storage device 2206 initially stores programs and data for various methods and embodiments described herein such as text region detection algorithms and weak classifier generation algorithms that are configured to perform the functions as described above. The mass storage device 2206 stores the programs and data in the form of computer storage media, which may include volatile and nonvolatile, removable and non-removable media implemented in any suitable method or technology for storage of information, such as computer readable instructions, data structures, program modules, or other data. Examples of removable storage and non-removable storage devices include magnetic disk devices such as hard-disk drives (HDD), optical disk drives such as compact disk (CD) drives or digital versatile disk (DVD) drives, blu-ray drives, and solid state drives (SSD).

The programs and data from the mass storage device 2206 are loaded into the memory 2204 via the system bus 2214 and processed by the processor 2202. During and after processing the programs and data, the processor 2202 may generate new data or modify existing data for storage in the memory 2204 and/or the mass storage device 2206. Depending on the desired configuration, the memory 2204 may be any suitable type of memory including but not limited to volatile memory (such as RAM), non-volatile memory (such as ROM, flash memory, etc.) or any combination thereof.

The I/O peripheral interface 2212 provides interface to various input and output peripheral devices such as a keyboard, mouse, pen, touch input device, image capturing device (e.g., camera, video camera, scanner, etc.), printer, etc. The network interface 2210 provides interface functions with external wireless or wired networks such as the Internet, local area network, wide area network, intranet, Bluetooth, and NFC (Near Field Communication). The computer system 2200 provides output information on the display 2208 via the system bus 2214.

The computer system 2200 may be implemented as a portion of a small-form factor portable (or mobile) electronic device such as a cellular phone, a smartphone, a personal data assistant (PDA), a personal media player device, a wireless web-watch device, a personal headset device, an application specific device, or a hybrid device that include any of the above functions. The computer system 2200 may also be implemented as a personal computer including both laptop computer and non-laptop computer configurations.

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For a firmware and/or software implementation, the techniques may be embodied as instructions stored on a computer-readable storage medium, such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, or the like. The instructions may be executable by one or more processors and may cause the processor(s) to perform certain aspects of the functionality described herein.

If implemented in software, the functions may be stored on or transmitted over as one or more instructions or code on a computer-readable storage medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable storage medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for detecting a text region in an image, the method comprising:
   detecting a candidate text region from the image;
   generating a set of oriented gradient images of the candidate text region;
   capturing a detection window image of the candidate text region;
   calculating a sum of oriented gradients for a region in one of the oriented gradient images;
   classifying whether the detection window image contains text by comparing the sum of oriented gradients and a threshold; and
   determining whether the candidate text region is a text region based on the classification of the detection window image.

2. The method of claim 1, wherein the region is a portion of a corresponding oriented gradient image, and wherein the portion corresponds to the detection window image.

3. The method of claim 1, wherein a plurality of classifiers arranged in parallel calculates a plurality of sums of oriented gradients for one or more regions in one or more of the oriented gradient images.

4. The method of claim 3, further comprising capturing a plurality of detection window images of the candidate text region, wherein a particular classifier classifies whether a particular detection window image of the plurality of detection window images contains text by comparing a particular sum of oriented gradients corresponding to the particular detection window image to the threshold.

5. The method of claim 4, wherein the classifiers determine whether one or more detection window images of the plurality of detection window images contain text.

6. The method of claim 3, wherein the one or more oriented gradient images have at least one orientation selected from a vertical direction, a horizontal direction, and a diagonal direction.

7. The method of claim 4, wherein each detection window image of the plurality of detection window images partially overlaps at least one other detection window image of the plurality of detection window images.

8. The method of claim 1, further comprising:
   converting the candidate text region into a binary image; and
   verifying whether the candidate text region is a text region based on one or more features of the binary image.

9. The method of claim 8, wherein verifying the candidate text region comprises:
   splitting the binary image into blocks;
   calculating the one or more features from the blocks;
   calculating a likelihood that each block contains text; and
   determining whether the candidate text region is the text region based on the likelihoods for the blocks.

10. The method of claim 9, wherein calculating the one or more features comprises:
    dividing each of the blocks into sub-blocks; and
    calculating the one or more features from one or more of the sub-blocks.

11. The method of claim 10, wherein the one or more features include at least one of a number of white pixels, a number of black pixels, a number of white pixel to black pixel transitions, and a number of black pixel to white pixel transitions.

12. A method for detecting a text region in an image, the method comprising:
    detecting a candidate text region from the image;
    generating a set of oriented gradient images of the candidate text region;
    capturing a detection window image from the candidate text region;
    calculating a sum of oriented gradients from a region in an oriented gradient image obtained from the detection window image;
    classifying whether the detection window image contains text by comparing the sum of oriented gradients and a threshold;
    determining whether the detection window image contains text based on the classification; and
    determining whether the candidate text region is a text region based on whether the detection window image contains text.

13. The method of claim 12, wherein the region is a portion of a corresponding oriented gradient.

14. The method of claim 12, wherein a plurality of classifiers arranged in parallel calculates a plurality of sums of oriented gradients from one or more regions in the oriented gradient images.

15. The method of claim 14, wherein each of the classifiers classifies whether the detection window image contains text by comparing a respective sum of oriented gradients of the plurality of sums of oriented gradients to a respective threshold.

16. The method of claim 15, wherein the detection window image is determined to contain text based on classifications of the classifiers.

17. The method of claim 14, wherein the oriented gradient image has at least one orientation selected from a vertical direction, a horizontal direction, and a diagonal direction.

18. The method of claim 12, wherein the detection window image partially overlaps a second detection window image.

19. The method of claim 12, further comprising:
converting the candidate text region into a binary image; and
verifying whether the candidate text region is the text region based on one or more features of the binary image.

20. The method of claim 19, wherein verifying the candidate text region comprises:
splitting the binary image into blocks;
calculating the one or more features from the blocks;
calculating a likelihood that each block contains text; and
determining whether the candidate text region is the text region based on the likelihoods for the blocks.

21. The method of claim 20, wherein calculating the one or more features comprises:
dividing each of the blocks into a sub-blocks; and
calculating the one or more features from one or more of the sub-blocks.

22. The method of claim 21, wherein the one or more features include at least one of a number of white pixels, a number of black pixels, a number of white pixel to black pixel transitions, and a number of black pixel to white pixel transitions.

23. An apparatus for detecting a text region in an image, the apparatus comprising:
a candidate text region detector configured to receive the image and detect a candidate text region from the image;
a gradient image generator configured to receive the candidate text region and generate a set of oriented gradient images of the candidate text region;
a detection window locator configured to capture a detection window image of the candidate text region;
a classifier configured to classify whether the detection window image contains text by comparing a sum of oriented gradients and a threshold, the sum of oriented gradients being calculated for a region in one of the oriented gradient images; and
a first determination unit configured to determine whether the candidate text region is a text region based on the classification of the detection window image.

24. The apparatus of claim 23, wherein the classifier includes a plurality of sub-classifiers arranged in parallel, each sub-classifier being configured to calculate a particular sum of oriented gradients for a particular region of a particular oriented gradient image of the set of oriented gradient images and to classify whether the detection window image contains text based on the particular sum of oriented gradients.

25. The apparatus of claim 24, wherein each sub-classifier calculates the particular sum of oriented gradients based on a particular orientation of a first oriented gradient image in the set of oriented gradient images.

26. The apparatus of claim 25, wherein each sub-classifier classifies whether the detection window image contains text by comparing the sum of oriented gradients with the threshold.

27. The apparatus of claim 26, wherein the classifier further includes a determinator configured to determine whether the detection window image contains text based on classifications of the plurality of sub-classifiers.

28. The apparatus of claim 24, wherein at least one of an orientation, a size and location of the region, and the threshold are determined based on an error rate of classification by a particular sub-classifier of the plurality of sub-classifiers.

29. The apparatus of claim 24, wherein the plurality of sub-classifiers are configured based on an AdaBoost algorithm.

30. The apparatus of claim 23, wherein the detection window image overlaps at least one other detection window image.

31. The apparatus of claim 23, further comprising
a binary conversion unit configured to convert the candidate text region into a binary image; and
a binary image classifier configured to verify whether the candidate text region is the text region based on one or more features of the binary image.

32. The apparatus of claim 31, wherein the binary image classifier is further configured to split the binary image into blocks and calculate the one or more features from the blocks.

33. The apparatus of claim 32, wherein the binary image classifier is further configured to divide each of the blocks into sub-blocks and calculate the one or more features from one or more of the sub-blocks.

34. The apparatus of claim 31, wherein the one or more features include at least one of a number of white pixels, a number of black pixels, a number of white pixel to black pixel transitions, and a number of black pixel to white pixel transitions.

35. A non-transitory computer-readable storage medium comprising instructions for detecting a text region in an image, the instructions causing a processor to perform operations including:
detecting a candidate text region from the image;
generating a set of oriented gradient images of the candidate text region;
capturing a detection window image of the candidate text region;
calculating a sum of oriented gradients for a region in one of the oriented gradient images;
classifying whether the detection window image contains text by comparing the sum of oriented gradients and a threshold; and
determining whether the candidate text region is a text region based on the classification of the detection window image.

36. The non-transitory computer-readable storage medium of claim 35, wherein the region is a portion of a corresponding oriented gradient image and the portion corresponds to the detection window image.

37. The non-transitory computer-readable storage medium of claim 35, wherein calculating further comprises calculating a plurality of sums of oriented gradients for one or more regions in one or more oriented gradient images in the set.

38. The non-transitory computer-readable storage medium of claim 37, wherein classifying further comprises classifying whether each detection window image contains text image by comparing a particular sum of oriented gradients corresponding to the detection window image to the threshold.

39. The non-transitory computer-readable storage medium of claim 38, wherein classifiers determine whether the detection window image contains text.

40. The non-transitory computer-readable storage medium of claim 37, wherein the one or more oriented gradient images have at least one orientation selected from a vertical direction, a horizontal direction, and a diagonal direction.

41. The non-transitory computer-readable storage medium of claim 35, wherein the detection window image partially overlaps a second detection window image.

42. The non-transitory computer-readable storage medium of claim 35, wherein the operations further include converting the candidate text region into a binary image and verifying whether the candidate text region is the text region based on one or more features of the binary image.

43. The non-transitory computer-readable storage medium of claim 42, wherein verifying the candidate text region comprises:
   splitting the binary image into blocks;
   calculating the one or more features from the blocks;
   calculating a likelihood that each block contains text; and
   determining whether the candidate text region is the text region based on the likelihoods for the blocks.

44. The non-transitory computer-readable storage medium of claim 43, wherein calculating the one or more features comprises dividing each of the blocks into sub-blocks, and calculating the one or more features from one or more of the sub-blocks.

45. The non-transitory computer-readable storage medium of claim 44, wherein the one or more features include at least one of a number of white pixels, a number of black pixels, a number of white pixel to black pixel transitions, and a number of black pixel to white pixel transitions.

46. A non-transitory computer-readable storage medium comprising instructions for detecting a text region in an image, the instructions causing a processor to perforin operations including:
   detecting a candidate text region from the image;
   generating a set of oriented gradient images of the candidate text region;
   capturing a detection window images from the candidate text region;
   calculating a sum of oriented gradients from a region in an oriented gradient image obtained from the detection window image;
   classifying whether the detection window image contains text by comparing the sum of oriented gradients and a threshold;
   determining whether the detection window image contains text based on the classification; and
   determining whether the candidate text region is a text region based on whether the detection window image contains text.

47. An apparatus for detecting a text region in an image, the apparatus comprising:
   means for receiving the image and detecting a candidate text region from the image;
   means for receiving the candidate text region and generating a set of oriented gradient images of the candidate text region;
   means for capturing a detection window images of the candidate text region;
   means for classifying whether the detection window image contains text by comparing a sum of oriented gradients and a threshold, the sums of oriented gradients being calculated for a region in one of the oriented gradient images; and
   means for determining whether the candidate text region is a text region based on the classification of the detection window images.

48. The apparatus of claim 47, wherein the region is a portion of a corresponding oriented gradient image and the portion corresponds to the detection window image.

49. The apparatus of claim 47, wherein the means for classifying includes a plurality of means for calculating a particular sum of oriented gradients for a particular region of a particular oriented gradient image of the set of oriented gradient images and classifying whether the detection window image contains text based on the particular sum of oriented gradients, wherein the plurality of means for calculating are arranged in parallel.

50. The apparatus of claim 49, wherein each means for calculating calculates the particular sum of oriented gradients based on a particular orientation of a first oriented gradient image in the set of oriented gradient images.

51. The apparatus of claim 50, wherein each means for calculating determines whether the detection window image contains text by comparing the sum of oriented gradients with the threshold.

52. The apparatus of claim 51, wherein the means for classifying further includes a second means for determining whether the detection window image contains text based on classifications of the plurality of means for calculating.

53. The apparatus of claim 49, wherein at least one of an orientation, a size and location of the particular region, and the threshold are determined based on an error rate of classification by each of the plurality of means for calculating.

54. The apparatus of claim 49, wherein one or more means for classifying are configured based on an AdaBoost algorithm.

55. The apparatus of claim 47, wherein the detection window image partially overlaps a second detection window image.

56. The apparatus of claim 47, further comprising
   means for converting the candidate text region into a binary image; and
   means for verifying whether the candidate text region is the text region based on one or more features of the binary image.

57. The apparatus of claim 56, wherein the means for verifying is further configured to split the binary image into blocks and calculate the one or more features from the blocks.

58. The apparatus of claim 57, wherein the means for verifying is further configured to divide each of the blocks into a plurality of sub-blocks and calculate the one or more features from one or more of the sub-blocks.

59. The apparatus of claim 56, wherein the one or more features include at least one of a number of white pixels, a number of black pixels, a number of white pixel to black pixel transitions, and a number of black pixel to white pixel transitions.

* * * * *